United States Patent [19]

Christensen et al.

[11] Patent Number: 5,468,510
[45] Date of Patent: Nov. 21, 1995

[54] LOW CALORIE MEAT PRODUCTS

[75] Inventors: Bent Christensen; Frits Mogensen, both of Hjørring, Denmark

[73] Assignee: Danish Crown Inc. A/S, Copenhagen, Denmark

[21] Appl. No.: 186,028

[22] Filed: Jan. 25, 1994

Related U.S. Application Data

[63] Continuation of Ser. No. 623,747, filed as PCT/DK90/00312, abandoned, which is a continuation-in-part of Ser. No. 597,719, Oct. 16, 1990, abandoned, which is a continuation-in-part of Ser. No. 566,223, Aug. 13, 1990, abandoned, which is a continuation-in-part of Ser. No. 517,663, May 1, 1990, abandoned.

[30] Foreign Application Priority Data

| Dec. 11, 1989 | [DK] | Denmark | 6250/89 |
| Apr. 26, 1990 | [DK] | Denmark | 1036/90 |
| Aug. 2, 1990 | [DK] | Denmark | 1852/90 |
| Oct. 10, 1990 | [DK] | Denmark | 2453/90 |

[51] Int. Cl.$^6$ ............................................. A23L 1/317
[52] U.S. Cl. .................... 426/574; 426/578; 426/646; 426/804
[58] Field of Search ........................... 426/641, 646, 426/652, 574, 804, 578

[56] References Cited

U.S. PATENT DOCUMENTS

| 3,309,204 | 5/1967 | Helmer et al. . | |
| 3,506,455 | 4/1970 | Savage et al. | 426/646 X |
| 3,600,186 | 8/1971 | Mattson et al. . | |
| 3,740,235 | 6/1973 | Weiner et al. . | |
| 3,748,148 | 7/1973 | Jehle et al. . | |
| 4,348,420 | 9/1982 | Lynch et al. | 426/646 X |
| 4,504,515 | 3/1985 | Hohenster et al. | 426/641 |
| 4,735,819 | 4/1988 | Johnson et al. | 426/646 |
| 4,844,922 | 7/1989 | Uemura et al. | 426/104 |
| 4,880,654 | 11/1989 | Okada | 426/574 |
| 4,997,671 | 3/1991 | Spanier | 426/646 |

FOREIGN PATENT DOCUMENTS

| 319987 | 6/1989 | European Pat. Off. . | |
| 0342972 | 11/1989 | European Pat. Off. . | |
| 2455861 | 5/1980 | France . | |
| 2254045 | 6/1973 | Germany . | |
| 2512973 | 9/1976 | Germany . | |
| 52-15854 | 2/1977 | Japan | 426/646 |
| 70466(1) | of 0000 | Luxembourg . | |
| 1022170 | 3/1966 | United Kingdom . | |
| 1310348 | 3/1973 | United Kingdom . | |
| 1423608 | 2/1976 | United Kingdom . | |
| 207070 | 2/1984 | United Kingdom . | |
| 2126868 | 4/1984 | United Kingdom | 426/646 |
| 2224629 | 5/1990 | United Kingdom . | |

OTHER PUBLICATIONS

Chopped meat-based foods prodn., 1986 Derwent Publications, 86-296885/45.
"Dietary Fiber Containing Sausages", 14(431)(C-759)(4374) Sep. 17, 1990.
Olsen Recipe from "Palaeg til husbehov", p. 73 (1984).
Jorgensen Recipe from "Sund & Slank", (1974).
Informative label on "Letpostej" manufactured by Stryhn's, Jan. 9, 1989.
Informative label on "Leverpostej", sold since 1989.
DDS Nutrio product and application guide, (Jun., 1989).
Dagbladet Article entitled "Who Is The Leaner?", (1989).
Runt Article entitled "Now I Am Allowed To Eat Sausage", Nr. 39/89.
Allt Om Mat, "Minimera . . . ", No. 9 (1989).
Hansen et al. *Food Preparation*, "Potato and Vegetable Forcemeat", pp. 22–23 (1962).
Lillelund *Food In Times of Rationing*, "May Extenders may be added . . . ", p. 21–(1941).
Suhr *Ingeborg Suhr Fourth Edition*, "Risoles II", p. 131 (1911).
Schmidt *Home–made Sausages*, "Juicy Potato Sausage", pp. 58–59 (1986).
Pedersen *Cooking in Times of Crisis*, "Potato–ham Rissoles", p. 22 (1942).
Andersen et al. *Good Cooking*, "Forcemeat I, Daily", pp. 121–122 (1973).
Andersen et al. *Good Cooking*, "Cutlet–Shaped Croquettes", pp. 168–169 (1973).
Unilever PLC, "Low calorie food prods.–contg. non–digestible polyol fatty acid polyester(s) and non–fermentable dietary fibres as anti–anal leakage agent", AU 8947116 A, pub. Jun. 28, 1990.
Skovgaard–Petersen "Brugsens Slankebog" (Danish recipe book), pp. 12, 64 (1987).
Fennema Food Chemistry, Second Edition, Revised and Expanded, p. 167–175.
Lorenz et al., "Physico–Chemical Properties of Defatted Heat–Moisture Treated Starches" Verlag Chemie GmbH. 1983.
Japanese Patent Abstract No. 61–115466, Jun. 3, 1986.
Japanese Patent Abstract No. 61–19467, Jan. 28, 1986.
Patent Abstract No. 88–342273/48 for 63–254962.
Japanese Patent Abstract No. 59–2675, Jan. 28, 1984.
Soviet Union No. 1266503, Abstract and English Translation (51) 4 A 22 C 11/00.
Soviet Union No. 1296083, Abstract and English Translation (51)4 A 22 C 11/00.
F. Wirth, "Technologies for Making Fat–reduced Meant Products", Fleischwirtsch. 68 (9), 1988.

*Primary Examiner*—Arthur L. Corbin
*Attorney, Agent, or Firm*—Foley & Lardner

[57] ABSTRACT

A low calorie meat product comprising a mixture comprising comminuted lean meat and a vegetable fat replacement ingredient comprising dietary fiber and starch.

76 Claims, No Drawings

LOW CALORIE MEAT PRODUCTS

This is a continuation of application Ser. No. 07/623,747, filed as PCT/DK90/00312, now abandoned, which is a continuation-in-part of application Ser. No. 07/597,719, filed Oct. 16, 1990, now abandoned, which is a continuation-in-part of application Ser. No. 07/566,223, filed Aug. 13, 1990, now abandoned, which is a continuation-in-part of application Ser. No. 07/517,663, filed May 1, 1990, now abandoned.

FIELD OF INVENTION

The present invention relates to a low calorie meat product comprising a vegetable fat replacement ingredient. In a particular aspect of the invention the low calorie meat product is a pet food or a ready-to-cook or ready-to-eat consumer meal or forms part thereof. Furthermore there is provided a process for preparing a low calorie meat product.

BACKGROUND OF THE INVENTION

There is an increasing consumer demand for meat products having a low calorie content. This demand is supported by accumulating evidence in the scientific literature that a high consumption of animal fat, especially fat with a high proportion of saturated fatty acids represents a significant health hazard, e.g. in relation to development of cardio-vascular diseases. Other health concerns associated with high-fat meat products are their high content of cholesterol and the addition of relatively high amounts of salt which are being added in order to improve the binding characteristics since salt aids in extracting the native water binding component myosin from the meat. Furthermore, a large proportion of consumers find meat products containing chemical additives such as water binding agents including phosphates, emulsifying additives, and anti-oxidants less acceptable.

However, the presence of fat in traditional meat products has a considerable desirable influence on the texture and palatability hereof. Thus meat products having a substantially reduced fat content tend to become dry, tough, and less succulent and the consumer will regard such products as being less palatable than similar products having a higher fat content. In some countries it is considered that e.g. breakfast sausages having a fat content below 35% are less palatable due to dryness and chewiness. In a recent publication by Wirth (*Fleischwirtschaft*, 1988,68, 1153–1156) it was concluded that a certain fat content is essential for the consistency of the products and that the preparation of meat products with a reduced fat content requires special process technology. By applying such technology it is, according to Wirth, supra possible to prepare e.g. frankfurters having a fat content as low as 10% or liver sausages with a maximum fat content of 15% without deteriorating the texture and palatability of the products. Wirth indicated that the preferred processes for compensating the technological function of the non-present fat would be: an enhanced activation of the myosin in order to enhance the water binding capacity and the addition of collagen substances and water.

There have been numerous attempts to reduce the fat content in meat products. The above publication is an example of one approach which is to simply reduce or "dilute" a high proportion of fat by adding water and water-binding enhancing agents to a high-fat product mixture. Other examples are found in GB 1 423 608 which discloses the addition of a dry gelling agent comprising a cellulose ether and a digestible carbohydrate which agent is added at concentrations up till 15% together with added water and in EP 0 319 987 which discloses a process for producing processed minced meat foods comprising adding an alkaline gel comprising up to 11 parts by weight of gel-forming materials including konjak mannan, up to 0.04 parts by weight of an alkaline substance and 15 to 50 parts by weight of water to minced meat. The use of an alkaline konjak mannan gel as a calorie-reducing agent in meat products has also been disclosed in GB 2 224 629.

An other approach to providing low calorie meat products is to reduce the amount of fat by including in the meat products non-meat ingredients while still attempting to maintain in such products a taste, flavour, texture, and appearance comparable to those of traditional high-fat meat products. Thus, U.S. Pat. No. 3,748,148 discloses a method of producing sausages with a reduced content of cholesterol in which 20–30% Brazil nuts are admixed to lean meats as a substitute for animal fat. The aims of this disclosure is to provide sausages with a reduced animal fat (including cholesterol) content. The relatively high proportion of the oil-containing nuts, however, does not provide a true low fat meat product. U.S. Pat. No. 4,504,515 discloses a process for preparing low fat meat products comprising the admixture of a mixture containing 13–40% weight percent frozen skimmed milk or whole milk and 55–80% by weight of lean meat in the presence of less than 5% by weight of seasonings and/or preservatives.

In U.S. Pat. No. 4,735,819 reduced calorie sausages comprising 40–90% of lean meat and 2–35% of cooked rice and having a fat content in the range of 4–35% by weight are disclosed. Test samples of sausages were rated on the basis of texture, flavour, and appearance by a test panel. However, the ratings were relatively poor for products having a high content of rice and a low content of fat. Accordingly, the preferred content of rice was 10% by weight and the preferred range of fat content was 10–25% by weight, the most preferred value being 20%. It is therefore obvious that these inventors have not solved the problem of being able to produce meat products with a fat content less than 20% by weight and at the same time maintaining the taste, texture, and appearance of high-fat meat products.

In a number of cases low cost meat products have been produced in which the fat is reduced moderately by the addition of various non-meat extenders. The main objectives of the use of such extenders are to aid the absorption of fat and the absorption of added water in the resulting meat product mixture in order to obtain meat products having high finishing cooking yields; adding protein value to the products; or improving the emulsion stability in products having a low meat content. As examples of such non-meat extenders may be mentioned bread crumbs, cereals, potato starch, milk powder, and vegetable protein.

The addition of dietary fiber- and starch-containing vegetable ingredients, e.g. in the form of cooked vegetables to meat products is known. It is thus not uncommon to add smaller amounts of boiled potatoes to certain traditional homemade products having a relatively high fat content, such as liver paste, sausages or forcemeat mixtures for meat balls. The purpose of this addition is primarily to obtain improved absorption of fat and added water and to reduce the cooking shrinkage. Furthermore, such addition of boiled potatoes contribute to obtaining a larger volume of the finished product whereby the required amount of the costly meat ingredient may be reduced. In GB 1 310 348 is disclosed a process for the production of dehydrated meat products such as meat balls whereby a pre-cooked dried vegetable material having retained the cellular structure of the vegetable, preferably dehydrated potatoes, is added to comminuted fat-containing meat in amounts ranging from 5 to 15 weight percent. The main purpose of adding the vegetable material is to improve the rehydration characteristics of the dried finished products. It is stated that it may be necessary to increase the inherent fat content of the products which originates from the fat-containing meat ingredient and typically being 8–13% to e.g. 20–30% by adding fat in order to reduce the time of rehydration. A similar use of carbohydrate materials such as boiled mashed potatoes in the preparation of instantly reconstitutable dehydrated, cooked meat products was disclosed in GB 1 022 170.

SU 1 266 503 describes a process for preparing cooked sausage wherein a "structurizing agent" comprising a 1:1 mixture of potato puree with milk and waste from groats manufacture is added to comminuted meat. The aims of the invention is to reduce the meat content by 35–40%. In SU 1 296 083 is disclosed a process for the preparation of sausage products wherein an emulsion comprising 8–10% by weight of a rehydrated dried vegetable material such as potatoes and other root crops and farm fat in a proportion of from 1:1 to 1:0.5 relative to the vegetable ingredient is added to comminuted meat to form a sausage mixture.

The present inventors have now found that low calorie meat products can be prepared in an industrially economical way by using meat from which essentially all attached fat has been mechanically removed and replacing the thus removed fat with a dietary fiber- and starch-containing ingredient and still obtain meat products which have essentially the same taste, consistency/texture and appearance as similar types of meat products prepared from meat having a high fat content. By using this novel process it has now been made possible to provide nutritionally highly desirable meat products having a fat content which is less than 15%, the fat content even being as low as 2–3% by weight and at the same time maintaining the same content of meat protein.

SUMMARY OF THE INVENTION

The present invention provides a low calorie meat product comprising a mixture comprising comminuted lean meat substantially free from visible fat, the proportion hereof being in the range of 20–95% by weight, calculated on the mixture, a vegetable fat replacement ingredient comprising dietary fiber and starch in a weight ratio which is in the range of 1:32 to 1:1, the proportion of the dietary fiber being at least 5% by weight of the dry matter of the fat replacement ingredient when determined as non-starch polysaccharides, and the proportion of the starch being at least 50% of the fat replacement ingredient dry matter, which fat replacement ingredient in the mixture has or is capable of being brought into a homogeneous consistency essentially without sensory recognizable particles, the proportion of the ingredient being in the range of 5–80% by weight, calculated on the mixture, optionally added salt, the proportion hereof when added being in the range of 0.1–4% by weight, calculated on the mixture, and optionally added water, the proportion of which when added is within the range of 5–50% by weight, calculated on the mixture and optionally one or more further ingredients, the proportion of which when added is in the range of 1–15% by weight, the low calorie meat product having a fat content which is at the most 15% by weight when the product is a hamburger product, the content of fat being at the most 10% by weight when the product is not a hamburger product, with the proviso that (i) the fat when the product is a product wherein the lean meat is fish meat does not comprise hardened fat and (ii) the dietary fiber is not konjak mannan.

The products according to the invention have essentially the same taste, texture, appearance and water binding capacity as similar conventionally prepared high-fat meat products.

The total proportion of fat in the low calorie product is preferably less than 12% by weight, more preferably less than 10% by weight, still more preferably less than 7% by weight, most preferably less than 5% by weight, and in particular less than 3% by weight. The comminuted lean meat may be derived from any edible animal species including mammals, birds, and fish.

In a further aspect, the low calorie meat products may constitute ready-to-cook or ready-to-eat consumer meals or form part thereof. In a still further aspect, the low calorie meat product may be a pet food.

The present invention relates further to a process for preparing a low calorie meat product, which process essentially comprises preparing a mixture by mixing comminuted lean meat substantially free from visible fat; a vegetable fat replacement ingredient comprising dietary fiber and starch in a weight ratio which is in the range of 1:32 to 1:1, the proportion of the dietary fiber on a fat replacement ingredient dry matter basis being at least 5% and the proportion of the starch being at least 50% of the fat replacement ingredient dry matter and which fat replacement ingredient in the coherent has or is capable of being brought into a homogeneous consistency essentially without sensory recognizable particles, said ingredient being miscible with the other ingredients; optionally added salt; and optionally added water, in which mixture the proportion of comminuted lean meat substantially free from visible fat is in the range of 20–95% by weight, the proportion of the fat replacement ingredient is in the range of 5–80% by weight, the proportion of added water when added is in the range of 10–50% by weight and the proportion of added salt when added is in the range of 0.1–4% by weight. To the resulting mixture is optionally added one or more further ingredients whereby a meat product mixture is obtained in which the proportion of further ingredients is in the range of 1–15% by weight, followed by distributing the thus obtained meat product mixture into suitable packagings, and optionally subjecting the meat product mixture to a preservation and/or cooking treatment prior to or subsequent to its distribution into the packagings to obtain the low calorie meat product having a fat content which is at the most 15% by weight, when the product is a hamburger product, the content of fat being at the most 10% by weight, when the product is not a hamburger product, with the proviso that (i) the fat when the product is a product wherein the lean meat is fish meat does not comprise hardened fat and (ii) the dietary fiber is not konjak mannan.

In a still further aspect, the present invention relates to a process for preparing a spreadable low calorie meat product, which process comprises as a first step the formation of an emulsion comprising an edible oil, water having a temperature of at least 50° C. and a protein powder, and subsequently mixing the resulting emulsion with the ingredients as defined above, the proportion of the emulsion from the first step comprising at the most 5% by weight of the resulting mixture.

DETAILED DESCRIPTION OF THE INVENTION

In one aspect the present invention provides a low calorie meat product comprising:

a) a mixture comprising
   (1) comminuted lean meat substantially free from visible fat, the proportion hereof being in the range of 20–95% by weight, calculated on the mixture,
   (2) a vegetable fat replacement ingredient comprising dietary fiber and starch in a weight ratio which is in the range of 1:32 to 1:1, the proportion of the dietary fiber being at least 5% by weight of the fat replacement ingredient dry matter when determined as non-starch polysaccharides (NSP), and the proportion of the starch being at least 50% of the fat replacement ingredient dry matter, which fat replacement ingredient is capable of having or being brought into a homogeneous consistency essentially without sensory recognizable particles in the mixture, the proportion of said vegetable fat replacement ingredient being in the range 5–80% by weight, calculated on the mixture,
(b) optionally added salt, the proportion hereof when added being in the range of 0.1–4% by weight, calculated on the mixture, and
(c) optionally added water, the proportion of which when added is in the range of 5–50% by weight, calculated on the mixture, and
(d) optionally one or more further ingredients, the proportion of which is in the range of 1–15% by weight of the meat product, the product having a fat content which is at the most 15% by weight, when the product is a hamburger product, the content of fat being at the most 10% by weight, when the product is not a hamburger product, with the proviso that (i) the fat when the product is a product wherein the lean meat is fish meat does not comprise hardened fat and (ii) the dietary fiber is not konjak mannan.

It is preferred that the low calorie meat product comprises essentially all of the native water of the above defined ingredients of the product. However, one or more of the ingredients may, prior to the mixing hereof have been subjected to treatments which results in a partial removal of the original naturally occurring water content present in the ingredients such as cooking or freeze-storage whereby 1–20% by weight of the native water content may be lost e.g. by evaporation or leaching. In the context of the present invention it is considered advantageous that the low calorie meat product comprises essentially all of the native water content of the ingredients, said content of ingredient native water in the product being at least 60% by weight, preferably at least 70% by weight, more preferably at least 80% by weight and in particular at least 90% by weight.

In one embodiment of the present invention there is provided a low calorie hamburger product. In the present context the term "hamburger product" designates a meat product comprising as the essential ingredient comminuted meat having a particle size which makes it possible to form coherent hamburger patties, said particle size typically being in the range of 2–10 mm such as 3–5 mm. When a hamburger product mixture is prepared the ingredients are blended essentially without further comminution of the meat for a period of time sufficient to obtain a uniform distribution of ingredients in the resulting coherent hamburger mixture.

Traditional, industrially prepared hamburgers may comprise chopped beef as the only ingredient, the fat content of the beef typically being in the range of 20–30% by weight. However, such hamburgers are prone to a considerable shrinkage during cooking i.a. due to leakage of melted fat and furthermore, the remaining fat content will contribute to a high calorie content of the products. In other types of traditionally prepared hamburgers a mixture is prepared which in addition to the fat-containing chopped meat comprises meat extenders such as vegetable proteins, e.g. soy protein, added water, added salt and seasoning ingredients. By incorporating such non-meat ingredients the proportion of meat may be reduced significantly, the proportion typically being in the range of 60–80% by weight, calculated on the product. The resulting fat content of such hamburger products are typically in the range of 18–25% by weight.

The present invention provides low calorie hamburger products according to the invention, which products comprise only comminuted meat substantially free from visible fat and the above defined fat replacement ingredient as well as hamburger products which in addition to said comminuted meat and the fat replacement ingredient comprises one or more ingredients selected from the group consisting of added salt, added water and further ingredients as defined hereinbelow. Even if the preferred source of meat for hamburgers is beef, other edible meats derived from other animal species may be used in hamburgers, such as veal, pork and lamb.

In an other embodiment of the invention there is provided a low calorie meat product wherein the mixture is a coherent forcemeat mixture. In the present context the term "a coherent forcemeat mixture" is used to indicate a low calorie meat product mixture which forms a stable homogeneously integrated mass in which the comminuted meat substantially free from visible fat and the added vegetable fat replacement ingredient during the mixing is subjected to mechanical forces whereby the particle size of the ingredients is reduced to levels where these ingredients are no longer visually recognizable and where they together with added salt, added water and optionally further ingredients as defined herein forms the above defined integrated mass having a coherent homogeneous consistency essentially without visually recognizable particles. It is also understood that this coherent structure of the mixture is retained during cooking and storage of the final products. Typical examples of such coherent forcemeat mixtures are mixtures for the preparing of sausage products, sliceable meat products and spreadable meat products.

When conventional sausage products, sliceable meat products and spreadable meat products comprising a significant proportion of fat is produced, the mixing of the ingredients results in the formation of a coherent forcemeat mixture in the form of a stable fat-water-protein emulsion. It has now surprisingly been found that a coherent forcemeat mixture as defined above can be obtained even if substantially all fat is replaced by a vegetable fat replacement ingredient according to the invention. It will be understood that the physical nature of the resulting low calorie forcemeat mixture according to the invention differs fundamentally from a traditional fat-water-protein meat product emulsion.

Thus, in one embodiment of the invention there is provided a low calorie meat product, the product comprising:
a) a coherent forcemeat mixture comprising
   (1) comminuted lean meat substantially free from visible fat, the proportion hereof being in the range of 20–90% by weight, calculated on the mixture,
   (2) a vegetable fat replacement ingredient comprising dietary fiber and starch in a weight ratio which is in the range of 1:32 to 1:1, the proportion of the dietary fiber being at least 5% by weight of the fat replacement ingredient dry matter when determined as non-starch polysaccharides (NPS), and the proportion of the starch being at least 50% by weight of the fat replacement ingredient dry matter, which fat replacement ingredient is capable of having or being brought into a homogeneous consistency essentially without sensory recognizable particles in the coherent mixture, the proportion of said vegetable fat replacement ingredient being in the range of 5–80% by weight, calculated on the mixture, (3) added salt, the proportion hereof being in the range of 0.1–4% by weight, calculated on the mixture, (4) added water, the proportion of which is in the range of 10–50% by weight, calculated on the mixture, and (b) optionally one or more further ingredients, the product having a fat content which is at the most 10% by weight.

It is preferred that the total proportion of fat in the resulting coherent forcemeat mixture-comprising products is less than 8% by weight, said proportion more preferable being less than 7% by weight, even more preferably less than 6% by weight, still more preferably less than 5% by weight, highly preferably less than 4% by weight and in particular less than 3% by weight.

As defined above, the low calorie meat products according to the invention comprises a vegetable ingredient as a fat replacement ingredient, the proportion of which, calculated on the mixture is in the range of 5–80%. It will be understood that the desired vegetable ingredient proportion in a particular product may depend on i.a. the proportions of the dietary fiber and starch of the selected vegetable ingredient.

In a preferred embodiment of the invention, the total amount of dietary fiber and starch present in the vegetable fat replacement ingredient is at least 5% by weight, calculated on the product. It is furthermore contemplated that for the preparation of certain types of low calorie meat products an even higher minimum total amount of dietary fiber and starch may be desirable such as at least 7% by Weight or even more preferably, at least 10% by weight.

According to the invention it is possible to provide low calorie meat products in which essentially all fat is replaced by a vegetable fat replacement ingredient as defined above, in such a way that the resulting products have the desired sensory and physical characteristics associated with similar types of conventionally prepared high-fat meat products. In addition, it can be contemplated that due to their significantly reduced fat, cholesterol and calorie content and optionally reduced salt content, the meat products according to the invention are nutritionally more favorable especially to consumers who are prone to developing cardio-vascular disorders or who have a desire to maintain or reduce their body weight. Furthermore, it may be considered advantageous by many consumers that the products as herein described can be prepared with a reduced content of chemical additives such as phosphates or anti-oxidants which are commonly used in conventional high calorie meat products having a high fat content.

The low calorie meat products according to the invention have the desired characteristics regarding texture, taste, flavour, cooking yields, stability to freezing and thawing, and appearance associated with similar conventional high-fat meat products types.

In the present context, the term "low calorie" is understood to indicate that the total amount of metabolizable energy contained in the meat products according to the invention is significantly reduced as compared to the energy content of traditionally prepared meat products. Overall, the energy content of a food product derives primarily from its content of protein, carbohydrate and fat. However, the contribution of the fat part of a food product to the total energy content relative to the other ingredients is per weight unit more than the double. Accordingly, the proportion of fat e.g. in meat products is rather decisive for the energy content of the products which energy content is generally indicated as calories or Joules per weight unit. In industrialized western countries like USA the fat in the average diet contributes with about 40% of the total energy intake. It is recommended by nutritionists that this contribution should be reduced to at least 30%.

In the low calorie meat products as defined above, the fat content is reduced to such an extent that the total content of energy can be reduced to less than half, preferably to about one third of the energy content of conventionally prepared meat products having a fat content which typically varies between 25 and 50% by weight. The low calorie meat products according to the present invention has a total energy content of less than 700 kJ/100 g, preferably less than 600 kJ/100 g, more preferably less than 500 kJ/100 g, and in particular less than 400 kJ/100 g. The contribution of the fat content of the low calorie meat products according to the invention to the total energy content hereof is less than 50%, preferably less than 40%, more preferably less than 30% and in particular less than 20%.

Examples of ingredient formulations resulting in meat products having the indicated desired low calorie contents are given below. It will be understood that the actual energy contribution from fat will depend on the amounts and types of other ingredients in a given meat product. In the present context, the term "low calorie" is used specifically to describe meat products having a total fat content (w/w) less than 15%, preferably less than 10%, more preferably less than 7%, most preferably less than 5%, and in particular less than 3%.

Characteristics of the vegetable far replacement ingredient

To obtain a low calorie meat product comprising a mixture as defined above it is essential to select a suitable vegetable fat replacement ingredient which confers physical and sensory characteristics to the final low calorie meat products of essentially the same nature as those of similar traditional high-fat meat products. The vegetable fat replacement ingredient according to the invention may be one single ingredient or a mixture of ingredients comprising dietary fiber being in a proportion of at least 5% by weight of the fat replacement ingredient dry matter and starch, the proportion of which is at least 50% by weight on a fat replacement ingredient dry matter basis. In the vegetable ingredient the weight ratio of the dietary fiber and the starch is in the range of 1:32 to 1:1, a preferred range being 1:20 to 1:2, a more preferred range being 1:15 to 1:3 and a most preferred range being 1:10 to 1:4.

The vegetable ingredient according to the invention has or is capable of being brought into a homogeneous consistency without sensory recognizable particles, it is substantially free from fat and has a neutral taste and colour whereby it does not affect the desired sensory characteristics of the resulting meat products. In the present context a neutral taste means that the taste of the fat replacement ingredient even when it is present in a low calorie meat product in the highest proportion as defined above does not affect the resulting taste of the low calorie meat products according to the invention in such a way that said low calorie meat products when tested by a sensory test panel can not be recognized as having a less acceptable taste than similar high-fat meat products.

A further characteristic of the fat replacement ingredient is that it is miscible with the other ingredients in such a way that a coherent mixture is obtainable. The term "miscible" is used to describe that when the fat replacement ingredient is mixed with the other ingredients of the coherent mixture, a smooth homogeneously integrated mass is formed and into which coherent mixture all of the added water has been stably absorbed.

The vegetable dietary fiber- and starch-containing fat replacement ingredient which when used for the preparation of low calorie meat products in the above defined amounts confer the above desired characteristics on the products, is primarily selected on the basis of the amount and the chemical and physical characteristics of the dietary fiber and starch contained therein.

Characteristics of the starch component of fat replacement ingredients

Starch is a naturally occurring, high-polymeric carbohydrate which is the reserve carbohydrate of plants. Starch occur in plant material in the form of white granules, usually made up of both a linear polymer (amylose) and a branched polymer (amylopectin). Starches of different botanical origins exhibit differences in their physical characteristics and chemical composition. Starch granules from grains such as rice and maize vary between 3 and 20 µm with respect to the average size of their largest diameter, and those from roots and tubers such as tapioca, arrowroot, or potatoes between 10 and 100 µm. Thus, as examples, rice starch has an average granule size of about 4 µm, corn starch one of about 14 µm and potato starch one of about 100 µm. Starch granules swell progressively in water as the temperature is raised into the range of 60–70° C. This swelling phenomenon is an indication of the binding of water to the starch. Above this temperature level the granules undergo gelatinization whereby a paste or sol is formed. In general, small granules swell and gelatinize more slowly and at a higher temperature than large granules. The structure of the individual granules may be disrupted by mechanical means. After rupture, the granules tend to swell and gelatinize even in cold water. Large granules, such as those of potato starch are more fragile than small granules of e.g. rice starch. Starches which have been pre-gelatinized by heat treatments and subsequently dried such as commercial starch products swells and gelatinize readily at temperature levels below that indicated above for non-treated starches.

Furthermore, starches of different botanical origins may vary in their chemical composition. Thus the distribution between amylose and amylopectin may vary and the content of lipids may be different. In the latter respect there is a characteristic difference between grain starches and starches derived from tubers and roots. In grain starches the amylose is in the form of a lipid-amylose complex whereas in tuber and root starches the amounts of lipids are insignificant. Thus, wheat starch contains 0.23% ether extractable components whereas potato starch contains only 0.12%. The relatively high lipid content of grain starches may have a bearing on the technological properties thereof, e.g. as regards their use as water binding ingredients in meat products since it has been reported that defatting of such starches increase their water binding capacities and swelling powers (Lorenz et al., 1983, Starch/Starke, 35, 123–129). Based upon these physical and chemical characteristics of different botanical forms of native starch it is contemplated that a particularly suitable vegetable fat replacement ingredient for the preparation of low calorie meat products according to the invention contains starch which in its native form comprises granules having an average size within the range of about 10–200 µm, preferably within the range of about 50–150 µm and which is substantially free from fat. The term "substantially free from fat" in this context indicates that the total amount of ether extractable components of the starch is less than about 0.15% by weight.

Starch or the starch fractions, amylose and amylopectin may be modified by heating with or without the addition of chemical reagents. This treatment may result in starch products having properties useful in the present invention. As an example, the treatment of starch with acids such as sulphuric acid causes a partial hydrolysis hereof, whereby "thin-boiling" starches are obtained. Starches may also be oxidized, e.g. by treatment with hypochlorite, whereby chlorinated starches are produced.

Furthermore, derivatives of starch may be useful components of a fat replacement ingredient according to the invention. Such derivatives may be starch esters such as acetates and carbamates of starch or fractions thereof or starch ethers such as hydroxy alkyl starch. In the context of the present invention the term "starch" is understood to include modified starches or modified starch fractions as defined above as well as the above defined starch derivatives.

When subjected to physical or chemical treatment starch may be degraded to smaller molecules of varying sizes, e.g. as a result of hydrolysis. Starch may be hydrolysed by chemical treatment with organic or inorganic acids or bases. Furthermore, hydrolysis of starch may be the result of treatment with starch hydrolyzing enzymes such as amylases or glucanases. An example of a chemical or enzymatic hydrolysate of starch which is useful in the food industry is maltodextrin. This term is used to describe a product comprising a mixture of oltgosaccharides and polysaccharides resulting from chemical or enzymatic hydrolysis of starches. A typical maltodextrin product contains less than 5% by weight of disaccharides and trisaccharides and about 95% by weight of higher saccharides. In the context of the present invention the term starch is understood to include maltodextrins as defined above.

During their experimentation the present inventors have found that attempts to replace fat in meat products with maltodextrins alone were not successful since such products do not have the same consumer acceptable sensory characteristics as those of high fat meat products. However, when a mixture of maltodextrins and dietary fiber in the same weight ratios as those defined hereinbelow for useful mixtures of starch and dietary fiber is used to replace fat, the resulting low calorie products have essentially the same taste, texture and appearance as similar high fat meat product types. Hence a mixture of maltodextrins and dietary fiber is an interesting vegetable fat replacement ingredient in low calorie meat products according to the invention.

Vegetable materials comprising at least 50% by weight of starch in the dry matter are suitable as fat replacement ingredients according to the invention. However, in particular low calorie meat products it may be more preferred that the proportion of starch is at least 60% and even more preferred that it is at least 70%. It will, however, be understood that the addition of vegetable materials comprising a proportion of starch in the dry matter which is below 50% may also result in low calorie meat products which have acceptable sensory and physical characteristics according to the definitions defined above.

Potato starch has several characteristics which makes it particularly suitable in the preparation of low calorie meat products which involves the preparation of a coherent meat product mixture. In such mixtures, the water binding capacity is an essential factor. In order to form a smooth coherent mixture which binds native and added water strongly, sufficient amounts of substances or ingredients having binding activity must be present. The meat itself contains a native water binding component, viz. myosin. Myosin is extracted during the mixing process when salt is present. In several types of meat product formulations this native water binding system is not sufficiently effective, for which reason additional water binding agents are added to the mixture. Such water binding agents may e.g. be selected from hydrocolloids, egg albumin, gelatin, cereal flours, starch, or collagen.

Potato starch has the highest water binding capacity of any starch, because it has the lowest degree of association between the starch molecules. For this reason potato starch has been used in conventional high-fat meat products to aid in water binding, in smaller amounts, usually ranging between 1 and 5% by weight of the meat product. It will be understood that this known use of potato starch as a water binding ingredient in the preparation of meat products is by no means comparable with the use thereof in the context of the present invention. When used in high-fat meat products, potato starch is not intended to replace fat even if it will be understood that any addition of ingredients over and above the high-fat meat to the high-fat base mixture will result in an indirect reduction of the final fat content proportionate to the amount of any added further ingredients.

Characteristics of the dietary fiber component of far replacement ingredients

During their experimentation the present inventors have found that replacement of fat by a vegetable ingredient essentially comprising starch or maltodextrins did not regularly result in low calorie meat products having the above desired sensory and physical characteristics. However, these characteristics were constantly achieved when a vegetable fat replacement ingredient was used which in addition to starch in a proportion of 50% or higher of the dry matter comprised at least 5% dietary fiber in its dry matter. A particularly useful dietary fiber:starch weight ratio in the fat replacement ingredient is in the range of 1:20 to 1:2, preferably in the range of 1:15 to 1:3 and most preferably in the range of 1:10 to 1:4

Essentially all plant materials contain dietary fiber, particularly in their cell walls. In the present context dietary fiber is used to describe a plant material which resists digestion by the human alimentary enzymes.

Dietary fiber is a generic term that includes a number of unique chemical structures and characteristic physical properties. The principal components of dietary fiber are the major structural components of plant cell walls: cellulose, non-cellulosic polysaccharides, mainly hemicellulose and pectic substances, and lignin. All dietary fiber components apart from lignin are non-starch polysaccharides (NSP). The term NSP are frequently used as a practical indication of the dietary fiber content of a plant material. It should, however, be noticed that NSP does not include lignin. Cell walls of immature plants consist of about 25% cellulose, 60% non-cellulosic polysaccharides and a trace of lignin, whereas the mature cell wall contains approximately 38% cellulose, 43% non-cellulosic polysaccharide, and 17% lignin.

In the present context, the term dietary fiber includes native or synthetic polysaccharides such as pectin, carrageenans, gums (including gum arabic, locust bean gum, guar gum, gum tragacanth, gum karaya), mucilages, algal polysaccharides such as alginates, and modified celluloses. including cellulose aliphatic ethers such as methyl and ethyl ethers, hydroxy-substituted ethers such as hydroxypropylmethyl ether, methylhydroxyethyl ether, carboxymethyl ether, hydroxymethyl ether and mixtures of such ethers.

A particular type of dietary fiber, viz. konjak mannan which has a very high content of glucomannans (more than 80% by weight of dry matter) has been suggested as a gelling agent in certain food products. However, this fiber product is not useful in the present invention as a dietary fiber component in a vegetable fat replacement ingredient. When e.g. konjak mannan is mixed with minced meat and subjected to gelation before or after the mixing the consistency of the resulting product is seriously impaired due to a very high viscoelasticity. Furthermore, it is known that the water-holding capacity of konjak mannan deteriorates significantly when a gel hereof or a meat product comprising such gel is frozen and thawed, whereby the gel changes into a spongy substance. It has been suggested to solve these problems by adding konjak mannan alone or in combination with a carbohydrate substance to meat product formulations in the form of a strongly alkaline gel or paste having a pH in the range of 9.0 to 10.4. Depending on the amount of the alkaline konjak component added, such an addition will result in an increase of pH in the meat product which is in the order of 0.5. However, such additions of strongly alkaline substances to meat products are not allowed in most countries. Finally, it is to be envisaged that the incorporation of such alkaline ingredients i meat products may result in aberrant organoleptic characteristics of the meat product. Finally, a process of preparing a meat product comprising the preparing of an alkaline konjak gel will be cumbersome and hence less cost effective than the process according to the invention. For the above reasons konjak mannan does not form part of the present invention.

Common sources of dietary fiber are: cereals, especially the parenchymatous endosperm and seed coats; fruits and vegetables, especially parenchymatous flesh, partly lignified vascular tissues, and cutinized epidermal tissues; and seeds in the parenchymatous cotyledons and thickened endospermal walls.

The proportion of dietary fiber in plant materials varies according to the botanical species and the maturity of the plant. As examples potatoes contain about 2.5% by weight corresponding to about 11.6% by weight on a dry matter basis and carrots about 2.1% of NSP on a fresh weight basis corresponding to about 18.3% by weight on a dry matter basis, and dried materials such as soy flour and dried peas contain about 14% and 19%, respectively of NSP on a dry weight basis. Among cereal materials white wheat flour has a NSP content of about 3.3%, whole wheat flour one of about 10.4%, and wheat bran one of about 41.7%, all figures on a dry weight basis. The proportion of NSP in brown rice dry matter is about 2.1% by dry weight.

Dietary fibers have a number of physical properties which singly or in combination in the presence of a high proportion of starch may contribute to their usefulness as a component of a fat replacement ingredient. From a technological point of view two major groups of dietary fiber components can be distinguished: (1) water-soluble components which include gums, pectins, carrageenans, mucilages and alginates. Such components are widely used in the food industry as thickening, gelling or stabilizing agents due to their ability to form hydrocolloids and (2) substantially water-insoluble dietary fiber components including hemicellulose and cellulose. A common feature of water-insoluble fibers is their ability to swell when mixed with water. This swelling property is also referred to as water holding capacity which indicates the amount of water which can be absorbed to the fiber. One important property in this respect is hydratability which i.a. is a function of a fiber's three-dimensional structure. Hydratability is reflected in a high water holding capacity. Particularly commercially interesting water-insoluble dietary fiber products useful in the present invention include pea fiber, potato fiber, tapioca fiber, beet fiber and cereal brans.

Both groups of dietary fibers as defined above are useful as components of a vegetable fat replacement ingredient according to the invention. Examples of use of both groups are given hereinbelow.

The use of fat replacement ingredients comprising a dietary fiber proportion in the range of 8–12% by weight of dry matter results in meat products of the desired quality. However, consumer preferences as to the texture and consistency of meat products may vary considerably in different market places. Since the proportion of dietary fiber may influence these product characteristics an appropriate proportion of dietary fiber in the fat replacement ingredient may vary considerably. It is considered that in general a minimum proportion of 5% NSP of the dry matter of the fat replacement ingredient is required to obtain an optimum low calorie meat product. However, it is not precluded that a smaller proportion of NSP in the coherent mixture may result in a satisfactory quality of certain meat products. It is contemplated that a proportion of dietary fiber lower than 5% NPS in the fat replacement ingredient may be appropriate in particular product types where food additives belonging to the group of compounds defined above as dietary fiber are used as additional ingredients. It is considered that the dietary fiber-type additive in such products in addition to its specific effect as a food additive may when added to the coherent mixture contribute to obtain a low calorie meat product having the above desired characteristics. In other types of low calorie meat products a considerably higher dietary fiber proportion may be appropriate such as higher than 15% NSP.

The dietary fiber may be in a native form which term indicates that it is present in the naturally occurring state and that it has not been modified by chemical processes such as substitution of certain moieties with others; treatment with acids, bases or enzymes; or esterification.

Useful vegetable fat replacement ingredients according to the invention

The vegetable fat replacement ingredient according to the invention may be a native non-fractionated plant material having a water content of at least 70% by weight i.e. fresh material in which the natural relative composition of components has not been changed. Such fresh plant materials include vegetable fruits such as pumpkins. Preferred native non-fractionated vegetable fat replacement ingredients according to the invention are selected from plant tuber materials such as potatoes and plant root materials such as tapioca roots, cassava roots or arrowroots. Such non-fractionated fresh plant material may be used as a fat replacement ingredient without any pretreatment. It is, however, considered that pre-cooking of the material is advantageous with regard to obtaining an appropriate coherent mixture. It is contemplated that i.a. the swelling of starch resulting from the heat treatment increases the water binding capacity of the fat replacement ingredient significantly. The appropriate time/temperature conditions for pre-cooking varies according to the type of fat replacement ingredient and the type of meat product being prepared. As an example peeled potatoes are pre-cooked by boiling in open air for about 20 minutes or in a pressure cooker for a time period sufficient to obtain the same tenderness as that obtained by the above boiling in open air.

It may be advantageous to have a raw or pre-cooked non-fractionated plant material comminuted prior to preparing the mixture. As an example boiled potatoes may be added in the form of comminuted or mashed potatoes which e.g. may be prepared by blending the boiled potatoes with all or a portion of the added water. The appropriate temperature of a suitable fresh non-fractionated plant material such as a boiled potato ingredient when it is added to the mixture may vary according to the product type being prepared. With certain product types it is advantageous to add the boiled fat replacement ingredient at a temperature within the range of 0°–25° C., whereas with other product types such as a paste product, the boiled ingredient is added while still hot.

When the selected fat replacement ingredient is a native non-fractionated plant material as defined above, a particularly useful proportion hereof in the coherent mixture is within the range of 10–70% by weight, preferably within the range of 15–60% by weight and more preferably within the range of 20–50% by weight.

In one embodiment of the invention the vegetable fat replacement ingredient may be a dry plant material having a water content of at the most 20% by weight. When such a dry material is used the amount of added water in the mixture has to be increased essentially relative to the amount required when a fresh plant material is used. In general, the required extra amount of added water corresponds to the difference between the water content of a fresh plant material and that of the particular dry fat replacement ingredient. When the selected vegetable fat replacement ingredient is a dry ingredient as defined above, a preferred useful proportion hereof in the coherent mixture is within the range of 5–15% by weight and more preferably within the range of 5–10% by weight.

A suitable dry vegetable fat replacement ingredient for use according to the invention may be a non-fractionated plant material selected from plant tubers, root crops, cereal grains and dicotyledonous plant seeds having in their dry matter a starch content of at least 50% by weight and a dietary fiber content of at least 5% by weight. Examples of such materials include: dried potatoes, lentils, wheat kernels, rye kernels, barley groats, and wheat wholemeal. It will be understood that such dry plant materials may be dehydrated, pre-cooked and/or divided into fine particles prior to use in order to obtain a coherent mixture in which the fat replacement ingredient occur without sensory recognizable particles. When a dry non-fractionated native plant material selected from cereal grains and dicotyledonous plant seeds is used as a fat replacement ingredient according to the invention it may preferably be in the form of particles having a largest diameter of at the most 2 mm. As defined hereinbefore the fat replacement ingredient according to the invention is an ingredient which when present in the mixture is capable of having or being brought into a homogeneous consistency without sensory recognizable particles. This characteristic is considered to be an essential prerequisite for obtaining the low calorie meat product having a consistency which cannot be distinguished from that of a similar product having a high content of fat. A vegetable ingredient having a water content less than 20% by weight and selected from cereal grains and dicotyledonous seeds which has a particle size of more than 2 mm such as oat flakes, may not be brought into the desired homogeneous consistency when certain conventional mixing procedures are used.

From a manufacturing point of view it may be particularly advantageous to use a fat replacement ingredient having a water content of at the most 20% by weight as defined hereinbefore which is a mixture of dry separated starch and dry separated dietary fiber. It is possible to compound such starch/dietary fiber mixtures which when used as fat replacement ingredients in accordance with the invention result in low calorie meat products having the above defined sensory and physical characteristics. Particularly useful starches for such compounded fat replacement ingredients are grain flour starches such as corn starch, potato starch and tapioca starch. In general, commercial starch products have not been subjected to treatment at swelling conditions. However, it may be advantageous to use starch which prior to compounding has been pre-boiled and/or subsequently dried.

In this context useful dietary fiber products are potato fiber, potato pulp, beet fiber, pea fiber, bean fiber, and tapioca fiber. As used herein potato pulp is meant to describe the part of a potato which is remaining when starch has been partially extracted from raw potatoes in an industrial potato starch manufacturing process. A typical composition of an industrially prepared potato pulp is as follows (w/w): Starch 30%, cellulose 25–30%, hemicellulose 10–15%, pectic substances 15%, ashes 5%, and protein 5%.

In a particular embodiment of the invention the fat replacement ingredient is obtained by supplementing a native non-fractionated plant material of which material the dry matter proportion of dietary fiber is less than 5% by weight and/or of which the dry matter proportion of starch is less than 50%, with a sufficient amount of separated dietary fiber and/or separated starch to result in a vegetable fat replacement according to the invention.

As an example, carrots which have a high dietary fiber content but a low starch content may be supplemented with a sufficient amount of a separated starch material. Likewise, polished (white) rice and brown rice which are grains rich in starch but with a dietary fiber content of only about 0.8% and about 2.4% by weight, respectively can be useful as the starch component of a useful fat replacement ingredient according to the invention when supplemented with one or more dietary fiber components as defined above. When using a mixture of rice and a dietary fiber component as the fat replacement ingredient it is preferred that at least the raw rice is boiled prior to being added to the other ingredients of the coherent mixture. It may be convenient to use pre-boiled or parboiled rice since the boiling time in the production plant is reduced significantly.

When traditional high-fat meat products are prepared it is common to add starch- and dietary fiber containing ingredients e.g. in the form of cereal flours and potato starch as auxiliary ingredients in smaller amounts such as 2–3% by weight, calculated on the product, the main purpose hereof being improved absorption of added water. Such ingredients may also be added to the low calorie meat products according to the invention. It will be understood that when such ingredients are being present they form part of the vegetable fat replacement ingredient as defined above.

In order to obtain low calorie products according to the invention which have a desirable shelf life it is essential that the vegetable fat replacement ingredients have a low content of contaminating spoilage microorganisms. It may therefore be required that the ingredients prior to being used in the production have been subjected to a chemical or physical decontaminating treatment resulting in a desired low level of microorganisms. Examples of useful decontaminating treatments are mechanical removal of attached soil, removal of the outer layers (peeling), washing, heat treatment, treatment with decontaminating gases such as ethylene oxide and ionizing irradiation.

When used according to the invention the starch- and dietary fiber containing ingredients as defined above satisfy all the requirements of a highly suitable fat replacement ingredient: The taste and flavour of the above fat replacement ingredients and their colour are neutral, for which reason they may constitute relatively large proportions of the low calorie meat product formulations without affecting negatively the desired taste and flavour associated with the meat, seasonings, and spices. It has even been found that the amounts of seasonings and spices can be reduced considerably in meat products prepared according to the process of the invention relative to conventional high-fat meat products. It is contemplated that this surprising effect may be ascribed to the reduced content of fat which generally decreases the intensity of taste and flavour contributed by added flavour regulating ingredients.

Furthermore, the vegetable fat replacement ingredients have desirable technological characteristics when applied according to the invention. The ingredients bind with the meat and other ingredients including added water to provide a coherent meat product mixture resulting in a texture, appearance, cooking yield, and stability to freezing in the finished meat product which are at least equivalent to what can be obtained for high-fat meat products. It has even been found that the water binding activity of the fat replacement ingredients are so pronounced that the addition of conventionally used water binding agents such as phosphates can be reduced or omitted.

It has surprisingly been found that a sensory test panel cannot with their senses distinguish the fat replacement ingredient present in a low calorie meat product prepared according to the invention from fat globules present in a conventionally prepared high-fat meat product. It is contemplated that one prerequisite herefor is that the fat replacement ingredient has a homogeneous consistency without sensory recognizable particles when added to the mixture or which during the process according to the invention is easily disintegrated to particles which are not sensory recognizable.

The required amount of the vegetable fat replacement ingredients as defined above depends on the particular type of meat product being prepared, the maximum allowable cost price, and the amounts and characteristics of the other ingredients including the additional ingredients defined below. As it has been explained hereinbefore, the compositions of the fat replacement ingredients varies considerably in particular regarding contents of starch, fiber and dry matter. Accordingly, the required amount of vegetable fat replacement ingredients may also vary according to the composition of the selected fat replacement ingredient. As an example, the same technological characteristics and quality of a particular low calorie meat product may be achieved with two different fat replacement ingredients used in different proportions.

The meat ingredient of low calorie meat produces

In the meat product mixture as defined above the proportion of comminuted lean meat substantially free from fat is in the range of 20–95% by weight calculated on the mixture, preferably in the range of 25–70% by weight, and in particular in the range of 30–50% by weight. In the present context meat is defined as animal tissues predominantly consisting of muscles and/or edible offal from the group of organs consisting of liver, kidneys, spleens, brains, tongues, or sweetbreads, said animal tissues having a water content substantially as the water content of the tissues when present in the live animal. The meat may be selected from any animal species, the meat of which is considered to be edible according to cultural or religious traditions. In order to be suitable for use according to the invention the meat must be lean and substantially free from visible fat. When the low calorie meat product is a pet food intended for feeding carnivorous pet animals such as dogs and cats less valuable meats may be used including offal products which are generally less acceptable as human food products, such as intestines, stomachs, genital organs or respiratory organs.

In the meat industry the term "lean" is generally used to describe meat predominantly comprising muscular tissue with attached connective tissue and varying minor proportions of attached surrounding fat. It will be understood that the degree of leanness can vary considerably. As used herein, however, lean meat is understood to mean meat essentially comprising muscular or offal tissue with associated connective tissues and from which surrounding natural fat has been removed mechanically e.g. by cutting to an extent where essentially all visible fat tissue has been removed. It will, however, be understood that meats having a fat content which, when the proportion of the meat in a particular product formulation is taken into consideration, will result in a total fat content of the meat product which is within the range defined hereinbefore, are included within the scope of this invention. However, most animal muscular tissue contains fat in the cells (intracellularly) and embedded between muscular cells (intercellularly). The content of this "internal" fat which cannot be removed by mechanical means typically constitutes 1–10 weight percent, the level depending on the animal species, the age and feeding condition of the animal, and the anatomical location of particular muscles. It will be understood that the internal fat is included in the term "lean meat substantially free from visible fat".

The thus defined meat can be used in a raw condition or, when it is appropriate in the preparation of a particular product type, the meat may be cooked prior to preparing the meat product mixture as required, by a suitable cooking procedure such as boiling, frying or pressure cooking. When used, the meat ingredient can have any temperature between 0° and 100° C., or it may even be in a frozen state.

It is essential for obtaining a coherent mixture that the meat when added has been comminuted to particle sizes allowing an effective mixing process during which a further comminution may occur. The comminution is carried out by cutting with knives or by grinding in a suitable grinding apparatus whereby the particle size is reduced to 5 mm or less. It is considered essential that the comminuted meat has not at any stage been subjected to complete or partial dehydration since it is well-known within the art that dehydrated meat when reconstituted does not regain the desired physical properties of non-dehydrated meat such as the water binding capacity.

The proportion of comminuted lean meat substantially free from visible fat in the above defined low calorie mixture is in the range of 20–95% by weight, the actual proportion primarily being dependent on the required type of meat product and the maximum allowable cost price. The meat for a particular meat product type may be selected from a single animal species in which case a specific muscle/offal or different muscles and/or offal tissues of the selected animal species may be used whereas in other cases it may be desirable to use a combination of meats from more than one animal species in a meat product according to the invention.

Added water referred to herein can be ordinary tap water, mineral water or water in which meat or vegetables have been cooked, whereby low molecular weight flavouring substances, minerals and vitamins dissolved therein is being supplied to the mixture. As an example potato pot liquor may be used. It may be advantageous to keep the temperature low in the mixture during mixing. A chilling of the mixture may be obtained by adding all or part of the water as ice, preferably in the form of crushed ice. In accordance with the invention the proportion of added water used in the process is in the range of 10–50% by weight, preferably 15–40% by weight, and in particular 20–35% by weight, the actual proportion depending primarily on the particular product type and the maximum product cost price aimed at. The salt ingredient of the low calorie meat products In the present context the term "added salt" is understood to mean a food-grade composition essentially comprising sodium chloride, a food-grade composition comprising sodium chloride and additional salts or a food grade composition comprising one or more alkali metal or alkaline earth metal salts, the compositions comprising other salts than sodium chloride having essentially the same salty taste as sodium chloride. A usual term for a salt composition essentially comprising sodium chloride is common salt.

Salt as defined above is added to most meat products for several purposes: It aids in the extraction of myosin from the meat whereby water binding in the product is enhanced. Furthermore, the addition results in a salty taste which is preferred by most consumers, and finally the presence of salt in meat products has a preserving effect due to partial or complete inhibition of spoilage microorganisms. According to the present invention the coherent mixture comprises added salt in the range of 0–4% by weight, preferably in the range of 0.5–3% by weight, and in particular in the range of 1–2% by weight.

For some meat products it may be advantageous to add salt as defined above supplemented with nitrites and/or nitrates e.g. in the form of alkali metal salts such as sodium or potassium nitrites and/or nitrates. In the meat industry such salt compositions are referred to as "curing salt". The added nitrites and/or nitrates exert a preserving effect in particular against undesirable anaerobic microorganisms such as *Clostridium botulinum*. In addition, the presence of nitrites and/or nitrates in red meat products assists in preserving the natural red colour of such meats. The proportion of nitrites and/or nitrates in curing salts is suitably in the range of 0.5–2.0% by weight. Thus, curing salt used in specific embodiments of the present invention contains 0.6% by weight of sodium nitrite.

Although it is generally desirable for the reasons indicated above to incorporate a certain proportion of added common salt in meat product formulations, a high dietary intake of sodium ions in the form of common salt may be a matter of considerable health concern. In industrialized countries the intake of sodium ions from the daily diet is significantly higher than what is physiologically required and desirable and at the same time the proportion of other cations such as potassium is frequently lower than the recommended intake hereof. This disproportionate cation composition of the diet is generally ascribed to the increasing addition of common salt to food products and to the fact that e.g. grain products become increasingly refined whereby especially the content of potassium ions in the overall diet is reduced considerably. It is considered that this disproportionate cation composition may lead to cardiovascular disorders such as hypertension and degenerative diseases. A need therefore exists to reduce dietary sodium intake and/or to increase the potassium intake.

One approach to fulfill this need is to reduce the common salt content in meat products. It has been found by the present inventors that it is possible to obtain low calorie meat products according to the invention in which products the proportion of common salt is lower than those typically used in high fat meat products essentially without impairment of the above desired effects of added common salt including the salty taste. In addition hereto the replacement of fat by a dietary fiber/starch-containing vegetable ingredient may contribute considerably to correction of the disproportionate dietary cation composition, viz when the fat replacement ingredient is one having a high proportion of potassium relative to fat. As an example, potatoes contain about 400 mg potassium/100 g whereas the content in pork fat is only about 25 mg/100 g.

An other approach to fulfilling the desire to reduce sodium content in the present low calorie meat products is to add food grade salt compositions having an acceptable salty taste in which most of or at least a part of the sodium ions has been replaced by other cations. Such food grade salt compositions having reduced sodium content may be referred to as common salt replacement compositions. The cations in such compositions may be selected from alkali metals such as potassium and/or from alkaline earth metals including magnesium and calcium. The cations are added in the form of organic salts such as lactates or tartrates or as inorganic salts including chlorides and sulphates. It will be understood that the exact composition of such salt compositions with reduced sodium content for use according to the invention may be varied infinitely, the selected composition depending on the particular product and the consumer preference in particular market places.

Low calorie pet animal food products

In one embodiment of the present invention, the low calorie meat product is a low calorie pet animal food product. In this context, the term pet animals is used to designate carnivorous animals such as dogs and cats. There are certain significant differences between the compositions of meat products for human consumption and pet food products. In contrast to meat products intended for human consumption, most industrially prepared pet food products are whole-meal products, the composition of which must be balanced so as to cover all nutritional requirements of the pet animal in question. Furthermore, typical whole-meat pet food products have a relatively low content of fat. Thus, as an example, a whole-meal dog food composition may comprise the major nutritional ingredients in the following ranges (weight %): protein 7.0–13.0%, fat 4.0–6.0%, carbohydrates 2.0–7.0%, water 71.0–84.5% and ashes 2.5–3.0%. A content of fat in the indicated ranges, however, contributes significantly to the total energy content of the product and there is a considerable need to develop dog food compositions having a reduced fat content relative to the above proportions.

An important requirement to be met by pet food products is a high degree of pet animal acceptance. In the pet food industry, products are therefore normally tested by a panel of the animals in question to test that the product has the desired acceptability. In the context of the present invention, it is therefore understood that the low calorie meat products being pet food products when they are tested in acceptability studies as normally used in the industry has essentially the same acceptability as products in which fat has not been replaced by a fat replacement ingredient as defined herein.

The major contribution to the fat content of pet food product originates from protein-containing slaughter and fish industry offal ingredients such as lungs, throats, liver, fowl carcasses and fish carcasses. The fat content of such raw materials may vary considerably. Thus, as examples, the fat content of chicken carcasses as provided may vary within the range of 8–35% by weight and the fat content of swine lungs within the range of 3–9% by weight. It is generally not possible to remove this fat content mechanically.

In the context of the present invention, a low calorie meat product being a pet food is understood to mean a pet food in which lean meat substantially free from visible fat is protein-containing ingredients which have been selected to have a content of fat which when the ingredients are added to the mixture in the above-defined proportions result in a low calorie pet food product having a fat content which is at the most 10% by weight, preferably at the most 7% by weight, more preferably at the most 5% by weight, still more preferably at the most 4% by weight, even more preferably at the most 3% by weight, most preferably at the most 2% by weight and in particular at the most 1.5% by weight.

Process of preparing low calorie meat products

In a further aspect the present invention relates to a process of preparing a low calorie meat product, said process essentially comprising:

1) preparing a mixture by mixing comminuted lean meat substantially free from visible fat; a vegetable fat replacement ingredient comprising dietary fiber and starch in a weight ratio which is in the range of 1:32 to 1:1, the proportion of the dietary fiber being at least 5% by weight of the vegetable fat replacement ingredient dry matter when determined as non-starch polysaccharides (NPS), and the proportion of the starch being at least 50% of the fat replacement ingredient dry matter, which fat replacement ingredient is capable of having or being brought into a homogeneous consistency essentially without sensory recognizable particles, said ingredient being miscible with the other ingredients; optionally added salt; and optionally added water, in which mixture:
   (a) the proportion of comminuted lean meat substantially free from visible fat is in the range of 20–95% by weight,
   (b) the proportion of the vegetable fat replacement ingredient is in the range of 5–80% by weight,
   (c) the proportion of added water when added is in the range of 10–50% by weight,
   (d) the proportion of added salt when added is in the range of 0.1–4% by weight, the mixing, when the low calorie meat product to be prepared is a spreadable meat product, being carried out in the following steps:
   (i) mixing a vegetable oil, the amount hereof being in the range of 0.5–3%, calculated on the coherent mixture, water having a temperature of at least 50° C. and a protein powder to obtain a first pre-mixture in the form of an emulsion,
   (ii) adding to said emulsion lean meat substantially without visible fat, vegetable fat replacement ingredient, added salt, and added water, the total proportion of the added ingredients being at least 95% by weight of the ingredients from (i) and (ii),
   (iii) mixing the ingredients from (i) and (ii) in such a way that a second pre-mixture is obtained, said second pre-mixture comprising evenly distributed coarse particles of meat and fat replacement ingredient having on average a largest diameter of at least 5 mm, and if necessary grinding the resulting second pre-mixture by passing the mixture through a high speed grinder, to obtain the mixture, 2) optionally adding to the mixture one or more further ingredients, whereby a meat product mixture results, in which the proportion of further ingredients is in the range of 1–15% by weight, preferably in the range of 2–12% by weight and in particular in the range of 3–10% by weight, 3) distributing the resulting meat product mixture into suitably sized packagings, and 4) optionally subjecting the meat product mixture to a preservation and/or a cooking treatment prior to or subsequent to its distribution into suitably sized packagings, to obtain a low calorie meat product having a fat content which is at the most 15% by weight, when the product is a hamburger product, the content of fat being at the most 10% by weight when the product is not a hamburger product, with the proviso that (i) the fat when the product is a product wherein the lean meat is fish meat does not comprise hardened fat and (ii) the dietary fiber is not konjak mannan.

As defined above, the invention in one aspect provides a low calorie meat product wherein the mixture is a coherent forcemeat mixture. Accordingly, the invention also provides a process for preparing a coherent forcemeat mixture, said process comprising:

1) preparing a coherent forcemeat mixture by mixing comminuted lean meat substantially free from visible fat; a vegetable fat replacement ingredient comprising dietary fiber and starch in a weight ratio which is in the range of 1:32 to 1:1, the proportion of the dietary fiber being at least 5% by weight of the vegetable fat replacement ingredient dry matter when determined as non-starch polysaccharides (NPS), and the proportion of the starch being at least 50% of the fat replacement ingredient dry matter, which fat replacement ingredient is capable of having or being brought into a homogeneous consistency essentially without sensory recognizable particles, said ingredient being miscible with the other ingredients; added salt; and added water, in which coherent forcemeat mixture:
   (a) the proportion of comminuted lean meat substantially free from visible fat is in the range of 20–90% by weight,
   (b) the proportion of the vegetable fat replacement ingredient is in the range of 5–80% by weight,
   (c) the proportion of added water is in the range of 10–50% by weight,
   (d) the proportion of added salt is in the range of 0.1–4% by weight,
   the mixing, when the low calorie meat product to be prepared is a spreadable meat product, being carried out in the following steps:
   (i) mixing a vegetable oil, the amount hereof being in the range of 0.5–3%, calculated on the coherent mixture, water having a temperature of at least 50° C. and a protein powder to obtain a first pre-mixture in the form of an emulsion,
   (ii) adding to said emulsion lean meat substantially without visible fat, vegetable fat replacement ingredient, added salt, and added water, the total proportion of the added ingredients being at least 95% by weight of the ingredients from (i) and (ii),
   (iii) mixing the ingredients from (i) and (ii) in such a way that a second pre-mixture is obtained, said second pre-mixture comprising evenly distributed coarse particles of meat and fat replacement ingredient having on average a largest diameter of at least 5 mm, and
   if necessary grinding the resulting second pre-mixture by passing the mixture through a high speed grinder, to obtain the coherent force-meat mixture, 2) optionally adding to the coherent forcemeat mixture one or more further ingredients, whereby a meat product mixture results, in which the proportion of further ingredients is in the range of 1–15% by weight, preferably in the range of 2–12% by weight and in particular in the range of 3–10% by weight, 3) distributing the resulting meat product mixture into suitably sized packagings, and 4) optionally subjecting the meat product mixture to a preservation and/or a cooking treatment prior to or subsequent to its distribution into suitably sized packagings, to obtain a low calorie meat product having a fat content which is less than 10% by weight.

When conventional meat products comprising a significant proportion of fat is produced, the mixing of the ingredients results in the formation of a homogeneous and adequately stable fat-water-protein emulsion. The main technological problems to be solved in the production of such conventional high-fat meat products are the water absorption by the meat and other ingredients and the emulsification of fat in the mixture. The absorption of water is obtained by several mechanisms of which the release of the native water binding muscular component myosin which take place when the meat is comminuted and cut in the presence of free water and salt is one, and the direct addition of water binding ingredients is an other. Most commonly both mechanisms are used at the same time. Traditional water binding ingredients are phosphates, particularly polyphosphates, cereal flours, or potato starch. To obtain stable emulsification in high-fat meat products it is necessary to add suitable emulsifying ingredients to the mixture even if the native protein of the meat will contribute to some extent. Added emulsifiers may be selected from a large group of chemical additives. However, their addition to meat products is subject to strict food law requirements and their presence in meat products are objected to by large groups of consumers. Natural emulsifying ingredients commonly used in the production of meat products belong to the group of proteins which may be of animal origin such as milk proteins in the form of milk powder or caseinates, or may be of vegetable origin, such as e.g. soy protein.

However, these technological processes applied in the industrial production of traditional high-fat meat products are not immediately applicable in the preparation of meat products having a low fat content as those provided herein. The composition of the coherent mixture as defined above differs from a high-fat meat product mixture in several important respects: The fat content is so low that the mixture does not constitute a fat-water-protein emulsion, the total water content may be significantly higher as a result of the replacement of fat having a high dry matter content by a fat replacement ingredient with a relatively low dry matter content. It will be understood that the latter problem is particularly pronounced in products where a high proportion of fat is replaced with the vegetable fat replacement ingredient. When developing the process of preparing the low calorie meat products the present inventors were therefore confronted with a number of technological problems in order to provide the coherent mixture as defined above, the solution whereto could not be found in the current high-fat meat product technology.

In accordance with the process of the present invention these problems have been solved in a way that simultaneously provides several advantages including the possibility to eliminate or reduce the additions of technological auxiliary ingredients. Thus, by reducing the proportion of fat to the hereinbefore defined low levels there is a correspondingly reduction of the need for adding emulsifying ingredients or anti-oxidants to the mixture. In addition, the water binding capacity of the vegetable dietary fiber and starch-containing fat replacement ingredient is so high that the need to incorporate further water binding ingredients as defined above, is significantly reduced or even eliminated. A further aspect of the present invention is that the low content of fat in the meat products prepared according to the invention permits a reduced content of seasoning agents and spices without affecting the desired flavour associated with traditionally prepared high-fat meat products. This is economically and hygienically advantageous, since these ingredients are relatively high-priced and frequently contaminated with large numbers of microorganisms, e.g. sporeforming bacteria which are difficult to eliminate. Finally, the high water binding capacity of the preferred fat replacement ingredients implies the possibility to reduce the content of salt to levels considerably lower than those of conventional high-fat meat products. In the latter products the content of salt is generally within a range of 2–5 weight percent, whereas in the products prepared according to the present invention it is preferably within the range of 1–2%.

It will be understood that the precise ingredient formulation and the exact technological procedure can be varied in numerous ways without departing from the scope of the invention. From a technological and consumer point of view meat products may be categorized e.g. as sausage products; sliceable meat products such as saveloy; spreadable products being defined as products having a creamy consistency which can readily be distributed as a continuous layer on e.g. bread by means of a knife including as examples liver pastes, meat pastes, meat spreads and pates; and hamburgers.

Each of these product categories has characteristic common features which results from the particular ingredient compositions and the way in which specific process steps are carried out. As one example, it may be aimed at providing sausages having a texture which provides a feeling of "resistance" when chewed. In such products the step of preparing the coherent mixture is carried out in such a way that the resulting mixture contains particles of a size which makes them sensory recognizable such as more than 0.5 mm. In high-fat sausage formulation this resistance is frequently obtained by the incorporation of fat-containing rind or other structurizing tissues such as chicken skin. The present inventors have achieved the same texture in low calorie sausages by adjusting the degree of grinding during mixing to obtain meat particles of the above defined size and/or the addition of suitable structurizing agents such as granulated proteins.

It is an interesting feature of low calorie spreadable meat products prepared according to the present invention that the consistency and thereby the spreadability hereof is substantially unaffected by low storage temperatures. It is contemplated that this advantageous feature primarily is a result of the low fat content of the products. In contrast high-fat spreadable meat products tend to become stiff and thereby less spreadable when kept cool due to hardening of the fat.

In processes of preparing traditional high-fat meat products it is rather critical that the temperature during mixing of the ingredients is kept low, preferably within the range of 0°–10° C. in order to obtain a stable fat-water-protein emulsion. To keep the temperature within this range it may be necessary to add ice during mixing. However, the present inventors have found that a low calorie coherent mixture as defined above can be obtained without the necessity of taking particular precautions to keep the temperature within the rather narrow range referred to above. Thus, a suitable coherent mixture can be obtained at mixing temperatures within the range of 0°–25° C.

In particular embodiments of the invention the process may comprise the addition to the coherent mixture of one or more further ingredients selected from the following groups of ingredients: cooked or uncooked vegetables having sensory recognizable particles, water binding agents, structurizing agents, preservatives, flavouring agents, spices, meat extenders, flavour enhancing agents, sweetening agents, colouring agents, vitamins, smoke, and curing agents, whereby a meat product mixture results in which the proportion of additional ingredients is in the range of 1–15% by weight, preferably 2–12% by weight, in particular 4–10% by weight.

Vegetables are included in a number of meat products as a source of nutrition or as flavouring ingredients, e.g. in certain types of sausages, meat pies, fish pies or meat loaves. Any suitable vegetable or mixtures of several vegetables may be used. When needed or desired, ingredients having favorable water binding characteristics such as cereal flours, polyphosphates, gelling agents including carrageenan, or starch may be added. The choice of flavouring agent(s) and/or spices will depend on the specific product type and the taste preferences of the consumers. As examples, but not limited thereto, flavouring agents may be selected from onions, garlic, celery, parsley, or paprika and spices from pepper, sage, ginger, thyme or mace. Other additional ingredients which may be added as desired are meat extenders (such as cereals, cereal derivatives, textured vegetable proteins, milk derivatives); flavour enhancing agents (such as MSG, hydrolyzed plant/vegetable protein, autolyzed yeast extract); sweetening agents including natural or artificial sugars, dextrose, synthetic sweeteners such as cyclamates; colouring agents such as natural and synthetic dyes; vitamins; smoke; and curing agents such as sodium nitrite. Suitable preservatives include chemical preservatives such as benzoic acid and sorbic acid and bacterial cultures which when added to the coherent mixture produce organic acids such as lactic acid or acetic acid.

In particular low calorie meat products it may be desirable to add further animal tissue ingredients to the mixture as flavouring agents. As an example, the addition of liver to a sausage or a meat pie may be desirable in order to obtain a particularly desired taste and flavour.

The resulting meat product mixture may be distributed into suitably sized packagings. Such suitable packagings are similar to packagings used for conventionally prepared meat products, and the selection of the most preferred packaging for a particular product according to the invention will be based on general criteria known in the art.

The process may optionally, when desirable, include a preservation treatment of the resulting meat product mixture prior to or subsequent to its distribution into packagings, said treatment resulting in an extension of the shelf-life of the product mixture or product relative to non-preserved product mixtures or products. The preservation treatment includes heat treatment processes, freezing, canning, irradiation, or smoke-curing. These treatments may be carried out according to procedures conventionally used in the food industry. In some cases the preservation treatment results in a ready-to-eat product, whereas in other cases the resulting preserved product must be subjected to a further cooking process such as immersion in boiling water, frying, grilling, baking, and treatment in a microwave oven, prior to being consumed.

In a particular embodiment the invention provides low calorie meat products in which the total proportion of fat is less than 10% by weight and which have essentially the same taste, texture, water binding capacity, and appearance as similar conventionally prepared high-fat meat products and which have been prepared according to a process essentially similar to the process of the invention as defined above.

Since the process as described hereinbefore is suitable for the preparation of a broad range of low calorie meat product types having essentially the same or better sensory and technological characteristics as similar conventional high-fat meat product types, the low-fat meat products of the invention include any meat product type for which it is desirable to obtain a low calorie substitute for the conventional high-fat meat product type. Examples of such low calorie meat products are: sausages, pastes, meat patties, luncheon meats, meat loaves, creams of fish, fish cakes, hamburger patties, meat pies and meat balls. It will, however, be understood that other product types may be prepared without departing from the scope and the idea of the invention.

The process of preparing as defined herein results in low calorie meat products having essentially the same characteristics as conventional high-fat product types with respect to taste, texture, water binding capacity, and appearance. As it has been explained in details above, the basic composition of the products prepared as defined, when compared with products having a high fat content, implies several nutritional advantages such as lower content of metabolizable energy, reduced content of fat, including cholesterol, optionally reduced levels of salt and other additives, e.g. water binding agents or emulsifying agents. A high water binding activity is one significant factor determining the cooking yield which is defined as the difference in weight between uncooked and cooked product. During cooking of conventional high-fat meat products there may be losses of water, protein, and of fat, the extent of which depends on the stability of the protein-fat-water emulsion. In the products according to the invention there will be practically no loss of fat, due to the low content thereof. It has furthermore been shown that the losses of water and protein in the form of "meat jelly" are similar to or even smaller than what is found for conventional high-fat meat products also when the addition of water binding agents are reduced or omitted. The high water binding capacity is also reflected in a high degree of stability to repeated freezing and thawing events, stability in this context meaning that the textural characteristics of the products remain unchanged and that there is no significant dripping of water.

Process of preparing low calorie spreadable meat products

It has been found that the processes of preparing low calorie sausage-type meat products, sliceable products and hamburgers as defined above were not immediately applicable in the preparation of spreadable low calorie meat products such as liver paste, especially when such spreadable products comprise an edible oil. It was found, however, that the incorporation in low calorie spreadable meat products of an edible oil, the amount hereof being in the range of 0.5–5% by weight, calculated on the products, aids significantly in obtaining a desired spreadability.

When attempting to prepare low calorie spreadable meat products comprising an edible oil according to such processes, a coherent mixture as defined above was not regularly obtained. However, by carrying out further experimentation it was e.g. found that a coherent mixture for liver paste can be obtained when the process is carried out in the following steps: (1) mixing of a small amount of edible oil, boiling water and a caseinate to obtain a stable, smooth emulsion, (2) adding the liver as whole livers, a native non-fractionated plant material vegetable fat replacement ingredient without any preceding comminution and optionally additional ingredients and mixing these ingredients in a vessel having a rotating propeller at the bottom, the rotation of which resulted in the liver and the vegetable fat replacement ingredient being divided into coarse particles which were evenly distributed in the emulsion from step (1), (3) grinding the mixture resulting from step (2) by passing the mixture through a high speed grinder attached to the bottom outlet of the mixing vessel, the passage through the grinder being effected by applying vacuum to the vessel having a rotating propeller at the bottom, followed by transferring the resulting grounded coherent low calorie liver paste mixture to a filling apparatus, filling the mixture into suitable containers and baking the liver paste. It is envisaged that this process will also be useful for the preparation of other spreadable low calorie meat products.

Thus, the vegetable fat replacement ingredient having the above defined composition and characteristics is a suitable vegetable ingredient in the preparation of spreadable meat products according to the invention, the addition of the vegetable ingredient in the below defined amounts resulting in spreadable meat products having desired sensory and structural qualities including the absence of a tendency that the lipids contained in the products separate, and a desirable spreadability.

In the present context, the term "spreadable meat product" designates an edible meat-containing product basically having a creamy consistency which can be readily distributed as a continuous layer on e.g. bread by means of a knife. Examples of spreadable meat products are meat pastes including liver paste, meat spreads and pâtés. It will be understood that the spreadable meat products basically having a creamy consistency may contain pieces of larger sizes such as it is conventional in certain types of pastes and pâtés.

There are several widely varying methods of producing spreadable meat products in private households, and it has also been suggested to prepare Danish liver paste (a spreadable product) from the following recipe 500 g of pork liver 200 g of boiled potatoes 1 onion 0.4 liter of milk 1 egg and 2 egg whites salt and pepper by mincing the liver, the potatoes and the onion twice through a meat mincing machine and adding the salt and pepper, the eggs (whipped) and the milk with stirring and then baking the resulting mixture for about 1 hour at 170° C. However, the industrial production of spreadable meat products requires a certain standardization and simplification of both the processes and the variety of ingredients included (eggs are normally not desired as ingredients thereof), and the cost of the individual ingredients and of the production stages is also of decisive importance. In practice, the spreadability of industrially produced spreadable meat products is often dependent on the presence of a certain amount of an edible oil. The industrially conventional manner of producing spreadable meat products is to carry out a mixing of the various ingredients, such as edible oil, water, starch, meat, etc., if necessary grinding the resulting mixture and subjecting the mixture to a subsequent preservation or cooking treatment such as baking.

However, in accordance with what is mentioned above, this traditional method does not always result in a satisfactory quality of the finished spreadable meat products regarding physical structure and sensory characteristics, one disadvantage being that the edible oil or the animal fat originating from the meat as defined above have a tendency to separate or leach from the resulting spreadable meat product resulting in the collection of the oil and/or animal fat on the surface of the product.

According to the present aspect of the invention, low calorie spreadable meat products which do not have the above disadvantageous characteristics may be prepared in a very desirable and economic manner when a vegetable ingredient as defined above is incorporated, and the mixing is performed in two stages, with an initial formation of an emulsion of the edible oil, water and a protein component, and a subsequent mixing of this emulsion with the meat, a vegetable ingredient as defined below, additional water, salt, and optionally other ingredients such as will be explained below.

By performing the process in this manner, an effective incorporation of the edible oil is obtained so that it will exert its ability to confer spreadability substantially without any tendency to leaching or separation of the edible oil, and a very economic process is obtained which leads to a sensory highly attractive product.

Thus, in this aspect the present invention can be defined in greater detail as a process for preparing a spreadable low calorie meat product, said process comprising the following steps:

(1) mixing an edible oil, water having a temperature of at least 50° C., and a protein powder having a water content of at the most 20% by weight, calculated on the protein powder, to obtain a first mixture in the form of an emulsion, (2) mixing the emulsion of step (1) with lean meat substantially free from visible fat, the proportion hereof being in the range of 20–90% by weight, calculated on the product, a vegetable fat replacement ingredient comprising dietary fiber and starch in a weight ratio which is in the range of 1:32 to 1:1, the proportion of the dietary fiber being at least 5% by weight of the vegetable ingredient dry matter when determined as non-starch polysaccharides (NPS), and the proportion of the starch being at least 50% by weight of the vegetable ingredient dry matter, which vegetable ingredient is an ingredient which is capable of having, or being brought into a homogeneous consistency essentially without sensory recognizable particles in the spreadable meat product, the amount of said ingredient being in the range of 5–80% by weight, calculated on the product, water, the proportion hereof being in the range of 10–50% by weight, calculated on the product, salt, the proportion hereof being in the range of 0–4% by weight, calculated on the product and optionally one or more additional ingredients, the total proportion hereof being in the range of 1–15% by weight, calculated on the product, the emulsion of step (1) comprising at the most 5% by weight of the resulting mixture, and if necessary grinding the resulting mixture to obtain a mixture comprising substantially evenly distributed particles of meat and vegetable ingredients, in which mixture the particles of meat have a largest diameter of at the most 1 cm, (3) optionally mixing further additional ingredients into the mixture resulting from step (2)

(4) optionally distributing the resulting mixture into suitably sized packagings, and (5) optionally subjecting the resulting mixture distributed into packagings, to a preservation and/or a cooking treatment.

In JP Appl. No. 63-990 it has been suggested to use an emulsified composition containing edible fats and oils as a replacement ingredient for fat and oils in the preparation of a paste product comprising low-fat meat, the proportion of the emulsified composition being in the range of 5–15% by weight of the product. In the context of the present invention it is, however, important to note that the emulsion of step (1) is not added as a fat replacement ingredient but as a means of obtaining a desired spreadability. This effect is obtained when the proportion of the emulsion according to the present invention is added in proportions which are at the most 5% by weight of the product, a preferred proportion being in the range of 2–4% by weight. Adding higher proportions than the above-defined would be disadvantageous since it would add significantly to the calorie content of the low calorie meat products according to the invention.

As the edible oil may be used any ester of fatty acids including animal fat and vegetable fat and oils which is liquid at ambient temperatures normally found in meat processing plants, i.e. typically in the range of 10°–20° C., such as a vegetable oil including sunflower oil, soy oil, olive oil, or grape kernel oil or an animal lipid having a melting point at or below the above defined ambient temperatures. Depending on the desired total lipid content of the spreadable meat products to be prepared the amount of added vegetable oil may preferably be in the range of 0.8–3% by weight calculated on the product and more preferably in the range of 1–2% by weight.

To obtain a useful emulsion in step (1) it is advantageous to add water at a temperature not less than 50° C., the preferred water temperature being in the range of 70°–100° C. When a pre-cooked vegetable ingredient is used in step (2) the water added in step (1) and in step (2) may advantageously be the pot liquor in which the vegetable ingredient has been pre-cooked. In a preferred embodiment of the invention the amount of water being added in step (1) is in the range of 1–3% by weight, calculated on the product. The amount of water which is added in step (1) is preferably is in the range of 1–3% by weight, calculated on the product.

Protein powders which are useful in step (1) may be any food-grade dry powder of animal or vegetable protein such as caseinates, globins, soy protein, or pea protein, an essential requirement for such compositions, however, being that the taste and flavour hereof when added in the highest amounts as indicated above does not confer an unacceptable taste and flavour to the spreadable meat product. In a preferred embodiment of the invention caseinate is used. The amount of the protein powder having a water content less than 20% by weight which is added in step (1) is preferably in the range of 0.2–2% by weight, calculated on the product and more preferably in the range of 0.3–1% by weight, calculated on the mixture.

In other low calorie meat products than spreadable meat products, it is normally preferred that the lean meat essentially free from visible fat is comminuted prior to preparing the coherent mixture, the meat used in the preparation of the spreadable low calorie meat product may be added to be mixed with the emulsion of step (1) in the form of pieces or lumps. Such meat pieces or lumps are normally provided in the meat industry when specific cuttings of meat is trimmed. Typically such meat trimmings have a largest diameter in the range of 5–15 cm. Furthermore, a piece of meat in the present context may be a whole piece of edible offal such as a whole liver or a whole kidney.

In step (2) of the process for preparing a spreadable low calorie meat product according to the present invention the emulsion from step (1) and the meat, vegetable ingredient, additional water, salt and optionally one or more further ingredients is mixed and if necessary the resulting mixture is ground to obtain a mixture comprising substantially evenly distributed particles of meat and vegetable ingredients, in which mixture the particles of meat have a largest diameter of at the most 1 cm.

In a particular embodiment of the process such a mixing is obtained by preparing the emulsion in a cylindrical milling vessel having a conically shaped bottom part provided with a rotating two-bladed propeller with blunt edges and subsequently mixing the emulsion with the meat and the vegetable ingredient as whole meat lumps such as whole pork livers or whole vegetables such as whole boiled potatoes, additional water, salt and optionally one or more additional ingredients. The rotation of the propeller results in a partial comminution of the meat and/or the vegetable ingredient into coarse particles of the above defined size.

The above resulting mixture may if desirable be further comminuted by grinding which in one preferred embodiment is carried out by passing the resulting mixture through a suitable grinding apparatus to obtain a more finely comminuted spreadable meat product mixture. In one particular embodiment of the invention the spreadable low calorie meat product mixture is passed through a high speed grinder having a plate with 3 mm openings which grinder is attached to the conical bottom part of the cylindrical vessel, the passage being effected by applying vacuum to the grinder attached to the vessel. It will be understood that grinding into finer particles may be obtained by selecting a grinding apparatus having a plate with openings having a diameter less than 3 mm.

Optionally, further ingredients selected from the group as defined hereinbefore may be added to the above spreadable meat product mixture to obtain particular mixtures for specific types of spreadable meat products.

In further optional subsequent steps, the spreadable low calorie meat product mixture may be distributed into suitable sized packagings as defined hereinbefore and subjected to a preservation and/or a cooking treatment selected from the treatment defined hereinbefore.

In a further aspect, the present invention relates to a spreadable meat product prepared according to the process as defined above. A typical example of such products is meat paste including liver paste. In the present context a spreadable meat paste product is understood to mean a spreadable meat product having a paste-like consistency and not containing visually recognizable particles. Meat paste products may contain any type of meat originating from edible mammals, poultry or fish including liver. Spreadable non-liver meat products are frequently referred to as meat "spreads". Further interesting examples of spreadable meat products are so-called pâtés, which term is generally used to describe spreadable meat products which as a basis comprises a paste-like spreadable meat product mixture whereto one or more particulate further additional ingredients, typically having a particle size in the range of 0.5–10 mm have been added and which particles in the final spreadable pâté may be visually recognizable. Examples of such particulate further additional ingredients are comminuted vegetables, comminuted meat and comminuted fruits including nuts.

In a further embodiment of the invention there is provided a process for preparing a low calorie meat product wherein the resulting product is a pet food and according to which process the lean meat added to the mixture in the above-defined proportions results in a low calorie pet food product having a fat content which is at the most 10% by weight, preferably at the most 7% by weight, more preferably at the most 5% by weight, still more preferably at the most 4% by weight, even more preferably at the most 3% by weight, most preferably at the most 2% by weight and in particular at the most 1.5% by weight. The lean meat ingredient is preferably selected from low cost slaughter and fish industry offal such as blood, intestines, stomachs, genital organs, fowl or lean fish carcasses, or respiratory organs.

In a still further aspect, the present invention relates to a low calorie meat product as defined herein and prepared according to the processes as defined herein which product is a dried, rehydratable product having been dried by a drying process which does not result in any substantial coagulation of the meat protein, such as freeze-drying.

The machinery, equipment, and utensils which can be appropriately applied in the herein defined process are the same as those conventionally used in the preparation of meat products and such machinery, equipment, and utensils are known per se by skilled persons in the art. In the below detailed Example 16 several details relating to suitable machinery, equipment, and utensils are recited which may also be illustrative in relation to this aspect of the present invention.

The invention is further illustrated in the below examples.

EXAMPLE 1

Preparation of hot-dog sausages

For hot-dog sausages the following ingredient formulation was prepared:

| | |
|---|---|
| Lean pork from which all visible fat had been removed | 7.000 kg |
| Peeled, cooked "Bintje" potatoes | 3.000 kg |
| Wheat flour | 0.400 kg |
| Potato flour | 0.400 kg |
| Icewater (3 kg crushed ice in 2 l water) | 5.000 kg |
| Curing salt (0.56% sodium nitrite) | 0.140 kg |
| Common salt | 0.140 kg |
| Dried skimmed milk | 0.500 kg |
| Phosphate | 0.050 kg |
| Seasonings | 0.040 kg |

The lean pork and the cooked, peeled potatoes were cooled to about 5° C. and ground separately through a 3 mm plate in a meat grinder. Four kg of the ground pork were transferred to a high-speed mixer and the meat was further comminuted by operating the high-speed grinder during three turns of the bowel followed by the addition of all the phosphate, half of the combined curing salt and common salt, and half of the ice water. The operating of the high-speed grinder was then continued until the meat had taken up all of the water after which the skimmed milk powder, the wheat flour, and the potato flour were added together with the remaining half of the ice water. The high-speed grinder was operated until the last added ice water had been taken up by the mixture. The remaining 3 kg of lean pork was added to the mixture and the grinding continued until the temperature in the mixture had increased to 10°–12° C.

Finally the seasoning ingredients (celery salt, white pepper, mace, paprika, and cardamom) were added together with the cooked potatoes. The high-speed grinder was then operated until a forcemeat mixture had been formed having a smooth coherent texture at which stage the internal temperature was about 14°–16° C.

The resulting sausage mixture was then conveyed to a sausage filler and stuffed into casings. The stuffed sausages were subsequently dried and smoke-cured at a temperature of 80° C. for about 30 minutes, followed by cooking in a water bath having a temperature of about 80° C., for about 10 minutes. After cooling, the sausages were allowed to dry in air and packaged in plastic foil bags which were evacuated.

In the resulting hot-dog sausages the ingredient composition were as follows (w/w): lean pork 24.1%, cooked peeled potatoes 18.1%, ice water 30.0%, dried skimmed milk powder 3.0%, wheat flour 2.4%, potato flour 2.4%, flavourings and spices 0.23%, and salt (including sodium nitrite) 1.7%. Accordingly, the base mixture ingredients (lean meat, added water, and fat replacement ingredient, i.e. cooked peeled potatoes) constituted in total 91.9% and the additional ingredients 8.1%.

The overall energy content of the finished hot-dog sausages was 407 kJ per 100 g. The distribution of the main energy-giving ingredients was as follows (w/w %): protein 10.7, carbohydrates 9.0, and fat 1.9. The indicated low fat content in the sausages according to the present example implies that the relative contribution of the fat content to the overall energy content was only 18%.

The sausages were subjected to sensory testing by a consumer panel comprising 42 randomly selected subjects who were asked to rate the taste, the texture and the appearance of the low calorie hot-dog sausages against conventionally prepared hot-dog sausages in which no fat replacement ingredient was included and in which the meat was pork cuttings with a rather high fat content. The panel was instructed to assess each of the following characteristics: (a) taste, (b) texture, (c) appearance, and (d) general impression according to the following hedonic scale: significantly inferior (1), inferior (2), slightly inferior (3), same as reference sample (4), slightly better (5), better (6), and significantly better (7). The figures in parentheses indicate numerical transformation values for the qualitative ratings which values were used in statistical analyses of differences. For these analyses mean scores and the standard error of means were calculated and the data subjected to a Student's t-test.

The main composition of the control sausages was as follows: Energy content 1180 kJ/100 g, protein 13% by weight, carbohydrates 3% by weight, and fat 24% by weight. Prior to the testing both types of sausages were heated for a few minutes by immersing them in boiling water to obtain an appropriate eating temperature.

The consumer test panel was not able to distinguish between the hot dog sausages prepared according to the invention and conventionally prepared high fat-containing hot dog sausages with respect to taste, texture, or appearance.

The test was repeated after the sausages had been frozen and thawed 3 times. Even after this treatment there were no detectable differences between the low calorie sausages and the high fat control sausages regarding the above parameters. This indicates inter alia that the water binding capacity of the low fat hot dog sausage formulation is equivalent to that of a conventional high fat hot dog sausage formulation.

EXAMPLE 2

Preparation of grill sausages

For grill sausages the following ingredient formulation was prepared:

| | |
|---|---|
| Lean pork from which all visible fat had been removed | 3.500 kg |
| Peeled, cooked "Bintje" potatoes | 1.500 kg |
| Curing salt (0.56% sodium nitrite) | 0.080 kg |

-continued

| | |
|---|---|
| Common salt | 0.050 kg |
| Icewater (1.4 kg crushes ice in 0.6 l water) | 2.000 kg |
| Dried skimmed milk | 0.250 kg |
| Phosphate | 0.035 kg |
| White pepper | 0.010 kg |
| Mace | 0.002 kg |
| Ginger | 0.002 kg |
| Coriander | 0.002 kg |

The process of preparation was essentially the same as that described in Example 1. In the resulting grill sausages the ingredient composition were as follows: lean pork 47.1%, cooked peeled potatoes 20.2%, ice water 26.9%, dried skimmed milk powder 3.4%, salt including sodium nitrite 1.8%, phosphate 0.5%, and flavourings and spices 0.22%. Accordingly, the base mixture ingredients comprised in total 96.0% and the additional ingredients 4.0%.

The overall energy content of the finished grill sausages were 364 kJ per 100 g. The distribution of the main energy-giving ingredients were as follows (w/w %): protein 12.6, carbohydrates 6.0, and fat 1.4. Thus the relative contribution of the fat content to the overall energy content was only 14%.

The grill sausages were tested by a consumer panel as described in Example 1, and the test panel was not able to distinguish between the sausages prepared according to the invention and conventionally prepared grill sausages having a high fat content neither when testing immediately after the preparation nor after the sausages has been frozen and thawed three times.

EXAMPLE 3

Preparation of luncheon meat

A test batch of low calorie luncheon meat was prepared wherein the conventionally used ingredient pork fat abdominal trimmings had been replaced by cooked peeled potatoes. As a reference product a batch of luncheon meat without cooked potatoes but containing fat trimmings was prepared. The ingredient formulations were as listed below (all quantities listed are w/w %):

| | Test batch | Reference batch |
|---|---|---|
| Lean pork shank meat | 9.000 kg (45.0%) | 9.000 kg (45.0%) |
| Fat trimmings | — | 6.000 kg (30.0%) |
| Cooked, peeled potatoes | 6.000 kg (30.0%) | — |
| Curing salt | 0.340 kg (1.7%) | 0.300 kg (1.5%) |
| Common salt | 0.240 kg (1.2%) | |
| Ice water | 4.360 kg (21.8%) | 4.154 kg (20.8%) |
| Phosphate | 0.100 kg (0.5%) | 0.100 kg (0.5%) |
| Sugar | 0.200 kg (1.0%) | 0.200 kg (1.0%) |
| Na-ascorbate | — | 0.006 kg (0.03%) |
| Total | 20.000 kg (100.0%) | 20.000 kg (100.0%) |

It appears from the above formulations that the low calorie test batch of luncheon meat contained only 1.7% curing salt whereas the reference product had a total salt content of 2.7%. Furthermore the test batch contained no antioxidant agent (Na-ascorbate). The omitted ingredients in the test batch were replaced by the corresponding amount of water.

As a first step in the preparation of the luncheon meat batches the pork shank meat was cured for 24 hours by the addition of 180 g of curing salt (2% by weight) followed by grinding through a plate having openings of 5 mm. Half of the ground meat was transferred to a high speed mixer and the phosphate and the remaining salt was added. The resulting mixture was further comminuted by operating the mixer for 60 seconds at 1400 rpm during which ¼ of the ice water was added. After stop of the mixer, the sugar and the ground cooked potatoes cooled to 5° C. (test batch) or ground fat trimmings at 5° C. (reference batch) were added after which the mixer was operated at 2800 rpm for 60 seconds during addition of ⅔ of the ice water. Subsequently, the remaining half of the meat was added and the mixer operated at 2800 rpm for 120 seconds while the remaining ¼ of the ice water was added. All ingredients had an initial temperature of 5° C. The final temperature of the resulting luncheon meat mixture was 14° C. This moderate temperature increase is obtained by using a mixture of ice and water.

The forcemeat mixture was conveyed to a filling machine from which the mixture was filled into cans holding 450 g and having a diameter of 72 mm. After sealing of the cans they were autoclaved for 70 minutes at a pressure of 2.1 bars (121.6° C.) followed by cooling in cold water.

The resulting batches of canned luncheon meat were subjected to chemical analyses by methods known per se and the total energy contents and the relative contributions thereto of carbohydrates, protein and fat were calculated on the basis of these analytical data:

TABLE 1

Compositions of luncheon meat batches (w/w %) and their energy contents

|  | Test batch | | Reference batch | |
| --- | --- | --- | --- | --- |
|  | % | % of total energy | % | % of total energy |
| Carbohydrates | 5.4 | 21.6 | 1.2 | 1.9 |
| Protein | 9.3 | 39.4 | 11.8 | 20.2 |
| Fat | 4.3 | 39.0 | 21.3 | 77.9 |
| Total energy, kJ per 100 g | | 429 | | 1065 |

The total energy content of the low calorie luncheon meat was only about 40% of that of the reference product. In this latter meat product the high fat content contributed with 77.9% of the total energy content, whereas in the test product the fat content only contributed 39%.

The sensory quality of the low fat test luncheon meat relative to that of the conventional reference product was tested as defined in Example 1. The results of the sensory assessments are summarized in the table below:

TABLE 2

Sensory characteristics of low calorie canned luncheon meat comprising 30% by weight of peeled, cooked potatoes as compared to the characteristics of conventionally prepared canned luncheon meat containing 21.3% by weight of fat

|  | N | Mean score | SEM | Significance |
| --- | --- | --- | --- | --- |
| Taste | 41 | 4.02 | 1.67 | ns |
| Texture | 41 | 3.85 | 1.46 | ns |
| Appearance | 41 | 3.51 | 1.43 | * |
| General impression | 41 | 3.93 | 1.42 | ns |

N: Number of subjects in panel
SEM: Standard error of mean
ns: Not statistically different
*$p < 0.05$
**$p < 0.01$
***$p < 0.001$ In general, the sensory panelists assessed the quality of the test luncheon meat as similar to or slightly inferior to the reference product. However, no statistically significant differences were found as regards taste, texture and the general impression.

As an indication of the emulsion stability of the luncheon meat mixtures the release of meat jelly and fat after autoclaving of the cans were measured by thoroughly scraping off the separated layers of meat jelly and fat, respectively which had collected at the top after autoclaving, followed by weighing of these layers and calculating the proportions hereof relative to the total weight of the products. In the low calorie luncheon meat cans 4.2% by weight of meat jelly had collected and there was no measurable fat release. However, in the reference product 8.3% by weight of meat jelly and 0.6% by weight of fat had collected. Based on these data the emulsion stability of the low fat luncheon meat appeared to be superior to that of the conventional high fat reference product. This finding is surprising when it is taken into consideration that the salt content of the test product is about 40% less herein than that of the reference luncheon meat product.

EXAMPLE 4

Preparation of beefburger patties

A test batch of low calorie beefburger patties and a reference batch of patties having a fat content of 20.5% were prepared. The ingredient formulations of the two batches were as shown below:

|  | Test patties | Reference patties |
| --- | --- | --- |
| Beef, 5% fat | 13.794 kg (69.0%) | — |
| Beef, 24% fat | — | 17.932 kg (89.7%) |
| Cooked, peeled potatoes | 4.138 kg (20.7%) | — |
| Water/ice | 2.068 kg (10.3%) | 2.068 kg (10.3%) |

The beef and the cooked potatoes, both ingredients at a temperature of 5° C., were ground separately through a plate having 3 mm openings. For the preparation of low calorie patties, the ground low fat beef and the ground cooked potatoes were mixed in a meat blender at 20 rpm for 5 minutes during which step the water with melting ice was added. The temperature after mixing was about −4° C. Patties (82–85 g) were formed on a Formax patty former and subsequently frozen and packaged in a cardboard box.

The resulting batches of hamburger patties were subjected to chemical analyses for their content of carbohydrates, protein and fat by methods known per se and the total energy contents and the relative contribution thereto of carbohydrates, protein and fat were calculated on the basis of these analytical data:

TABLE 3

Compositions (w/w %) of hamburger patty batches and their energy content

|  | Test batch | | Reference batch | |
| --- | --- | --- | --- | --- |
|  | % | % of total energy | % | % of total energy |
| Carbohydrates | 2.3 | 8.0 | 0.6 | 0.9 |
| Protein | 15.6 | 57.9 | 16.0 | 26.5 |
| Fat | 4.3 | 34.1 | 20.5 | 72.6 |
| Total energy, kJ per 100 g | | 491 | | 1099 |

The total content of energy was reduced in the low calorie patties as compared to the conventional reference product by about 55%. Furthermore, the contribution of fat to the total energy content in the test batch of patties was only 34.1% whereas the corresponding value in the reference product was as high as 72.6%.

The beefburger patties were thawed at room temperature and subsequently fried in a conventional manner on a saucepan until they were thoroughly done prior to testing of the sensory quality by a consumer test panel essentially according to the procedure described hereinbefore. The results of the sensory assessments were as summarized below:

TABLE 4

Sensory characteristics of low calorie beef hamburger patties comprising 20.7% by weight of peeled, cooked potatoes as compared to the characteristics of conventionally prepared hamburger patties containing 20.5% fat

|  | N | Mean score | SEM | Significance |
|---|---|---|---|---|
| Taste | 41 | 5.15 | 1.54 | *** |
| Texture | 41 | 5.15 | 1.39 | *** |
| Appearance | 41 | 5.00 | 1.15 | *** |
| General impression | 40 | 4.88 | 1.38 | *** |

N: Number of subjects in panel
SEM: Standard error of mean
ns: Not statistically different
*$p < 0.05$
**$p < 0.01$
***$p < 0.001$ Overall, the low calorie beefburger patties were rated by the test panel as being slightly better than the conventional reference product for all sensory characteristics assessed. All the differences found were statistically significant at a 0.1% level.

EXAMPLE 5

Preparation of a low calorie chicken pie

A test batch of a low calorie chicken pie comprising 24.4% cooked peeled potatoes was prepared. The characteristics of this meat product was compared with those of a conventional reference batch of chicken pie containing about 22% by weight of fat. The ingredient formulations for the two batches of chicken pie were as shown below:

|  | Test batch | Reference batch |
|---|---|---|
| Chicken meat, cooked | 4.522 kg (22.6%) | 4.262 kg (21.3%) |
| Chicken skin | 3.130 kg (15.7%) | 3.130 kg (15.7%) |
| Cooked, peeled potatoes | 4.870 kg (24.4%) | — |
| Pork fat trimmings | — | 4.870 kg (24.4%) |
| Pork shank meat | 2.782 kg (13.9%) | 2.782 kg (13.9%) |
| Boiling water | 3.478 kg (17.4%) | 3.478 kg (17.4%) |
| Skimmed milk powder | 0.348 kg (1.7%) | 0.348 kg (1.7%) |
| Common salt | 0.244 kg (1.2%) | 0.400 kg (2.0%) |
| Dried onions | 0.052 kg (0.3%) | 0.100 kg (0.5%) |
| Glucose | 0.034 kg (0.2%) | 0.034 kg (0.2%) |
| Madeira | 0.348 kg (1.7%) | 0.348 kg (1.7%) |
| Olives | 0.112 kg (0.6%) | 0.112 kg (0.6%) |
| White pepper | 0.010 kg (0.05%) | 0.016 kg (0.08%) |
| Maritza spice mixture | 0.070 kg (0.4%) | 0.120 kg (0.6%) |
| Total | 20.000 kg (100%) | 20.000 kg (100%) |

As it appears, the amounts of salt and spices were significantly reduced in the low calorie chicken pie formulation.

The low calorie chicken pie batch was prepared by the following method: The pork shank meat was ground through plate having 3 mm openings. The chicken skin and the peeled potatoes were boiled for 20 minutes immediately prior to use and transferred while still hot to a pre-warmed high-speed grinder. After addition of the following ingredients: dried skimmed milk, common salt, dried onions, glucose, madeira and white pepper the grinder was operated during two turns of its bowel while the knife was run at 2800 rpm. Following this operation the boiling water was added and the grinder further operated for about 80 seconds. As the next step the ground shank meat, the olives and the maritza spice mixture were added to the resulting mixture followed by operating the high-speed grinder at 2800 rpm during 5 turns of the bowel. The resulting pie mixture having reached a temperature of about 50° C. was distributed into aluminium foil trays each holding 200 g. Finally, the filled trays were baked while placed in a water bath at 180° C. for about 45 minutes followed by cooling at 5° C.

The reference batch was prepared in essentially the same manner, the ground boiled potatoes, however being replaced by the same amount of similarly ground fat trimmings.

The resulting chicken pie batches were analyzed by methods known per se for their contents of the main energy-giving ingredients, i.e. carbohydrates, protein and fat. The total energy contents of the batches and the relative contributions thereto of carbohydrates, protein and fat were calculated according to these analytical data.

The resulting figures are summarized below:

TABLE 5

Compositions of chicken pie batches (w/w %) and their energy content

|  | Test batch | | Reference batch | |
|---|---|---|---|---|
|  | % | % of total energy | % | % of total energy |
| Carbohydrates | 5.7 | 14.7 | 1.9 | 2.7 |
| Protein | 15.1 | 41.0 | 16.1 | 24.9 |
| Fat | 7.6 | 44.3 | 21.9 | 72.4 |
| Total energy, kJ per 100 g | 670 | | 1178 | |

The total energy content of the chicken pie batch wherein the pork fat trimmings had been replaced by an equal amount of cooked potatoes was reduced by about 43% relative to the reference pie batch.

The baked low calorie chicken pie test batch and reference batch were subjected to testing of their sensory quality according to the procedure described hereinbefore. The results of these sensory ratings are summarized in Table 6 below:

TABLE 6

Sensory characteristics of low calorie chicken pie containing 24.4% by weight of peeled, cooked potatoes as compared to the characteristics of conventionally prepared chicken pie containing 21.9% by weight of fat

|  | N | Mean score | SEM | Significance |
|---|---|---|---|---|
| Taste | 41 | 4.93 | 1.54 | *** |
| Texture | 41 | 4.61 | 1.67 | * |
| Appearance | 41 | 4.68 | 1.22 | *** |
| General impression | 41 | 4.85 | 1.39 | *** |

N: Number of subjects in panel
SEM: Standard error of mean
ns: Not statistically different
$p < 0.05$

TABLE 6-continued

Sensory characteristics of low calorie chicken pie containing 24.4% by weight of peeled, cooked potatoes as compared to the characteristics of conventionally prepared chicken pie containing 21.9% by weight of fat

| | N | Mean score | SEM | Significance |
|---|---|---|---|---|
| p < 0.01 | | | | |
| p < 0.001 | | | | |

For all the sensory characteristics tested by the panel the low calorie chicken pie was rated better than the reference chicken pie. The differences identified were all statistically significant.

EXAMPLE 6

Preparation of fish cake balls

A low calorie test batch and a conventional reference batch of fish cake balls having the below ingredient formulations were prepared:

| | Test batch | Reference batch |
|---|---|---|
| Fillet of cod | 11.704 kg (58.5%) | 11.852 kg (59.3%) |
| Lard | — | 4.000 kg (20.0%) |
| Cooked, peeled potatoes | 3.902 kg (19.5%) | — |
| Breadcrumbs | 1.114 kg (5.6%) | 1.008 kg (5.0%) |
| Whole-egg | 1.338 kg (6.7%) | 1.136 kg (5.7%) |
| Mineral water | 1.114 kg (5.6%) | 1.104 kg (5.5%) |
| Wheat flour | 0.490 kg (2.5%) | 0.490 kg (2.5%) |
| Common salt | 0.304 kg (1.5%) | 0.342 kg (1.7%) |
| White pepper | 0.036 kg (0.2%) | 0.068 kg (0.3%) |

The two batches of fish cake balls were prepared by the following procedure: Cod fillets and peeled, cooked potatoes cooled to about 4° C. were ground separately through a plate having 3 mm openings. The ground cod fillets were transferred to a high-speed grinder together with the breadcrumbs, salt and pepper. The high-speed grinder was operated at 2800 rpm during five turns of its bowel. After stopping the grinder whole eggs were added followed by operating the grinder at 2800 rpm for 30 seconds. Subsequently, the grinder was operated at low speed (1400 rpm) for 30 seconds during which the mineral water was added whereafter the grinder was operated for a further period of 30 seconds at 2800 rpm and stopped. Finally, the ground cooked potatoes were added to the resulting mixture and the grinder was operated at 2800 rpm for 60 seconds. The resulting fish cake mixture which had a final temperature of 4° C. was transferred to a patty former and formed herein to fish cake balls which were subsequently fried in a 1:1 mixture of vegetable oil and margarine at 160° C. for 5 minutes followed by baking in an oven at about 220° C. for about 15 minutes when the core temperature had reached 92° C.

The resulting two batches of fish cake balls were analyzed by methods known per se for their contents of carbohydrate, protein and fat. The total content of energy in the fish cake balls and the relative contributions hereto of the above contents of carbohydrate, protein and fat were calculated based on these data. The results are shown below:

TABLE 7

Compositions of fish cake ball batches (w/w %) and their energy content

| | Test batch | | Reference batch | |
|---|---|---|---|---|
| | % | % of total energy | % | % of total energy |
| Carbohydrates | 9.5 | 26.7 | 6.2 | 9.7 |
| Protein | 14.9 | 44.2 | 15.1 | 24.9 |
| Fat | 4.6 | 29.1 | 18.6 | 65.5 |
| Total energy, kJ per 100 g | | 611 | | 1105 |

The total energy content in the low calorie fish cake balls was reduced by about 45% relative to the lard-containing reference batch.

The sensory quality of the low calorie fish cake balls was assessed by a consumer panel as described in the above Examples. The results of these sensory assessments are summarized in Table 8 below:

TABLE 8

Sensory characteristics of low calorie fish cake balls containing 19.5% by weight of peeled, cooked potatoes as compared to the characteristics of conventionally prepared fish cake balls containing 18.6% by weight of fat

| | N | Mean score | SEM | Significance |
|---|---|---|---|---|
| Taste | 42 | 4.14 | 1.74 | ns |
| Texture | 42 | 4.33 | 1.51 | ns |
| Appearance | 42 | 4.55 | 1.33 | * |
| General impression | 42 | 4.64 | 1.48 | ** |

N: Number of subjects in panel
SEM: Standard error of mean
ns: Not statistically different
p < 0.05
p < 0.01
p < 0.001

For all the sensory characteristics the test panel found the low calorie fish cake balls to be slightly better than the reference batch of balls. For appearance and general impression the differences in flavour of the test product were statistically significant.

EXAMPLE 7

Emulsion stability of low calorie sausages comprising different proportions of cooked potatoes Four test batches of low calorie sausages comprising varying proportions (w/w %) of cooked, peeled potatoes, i.e. 40%, 30%, 20% and 10%, respectively were prepared essentially as described in Example 1. At the same time 4 corresponding reference batches of sausages were prepared, wherein the cooked potatoes were replaced by exactly the same proportions of pork abdominal fat trimmings. All test batches as well as all reference batches comprised as a further ingredient lean pork in the form of shank meat from which substantially all visible fat had been removed. The proportion hereof was increased proportionately with decreasing proportions of either cooked potatoes (test batches) or fat trimmings (reference batches). Below are shown ingredient formulations for the test batch comprising 40% by weight of cooked potatoes and for the corresponding reference batch comprising 40% by weight of fat trimmings:

|  | Test batch | Reference batch |
|---|---|---|
| Pork shank meat | 5.458 kg (27.3%) | 5.342 kg (26.7%) |
| Cooked, peeled potatoes | 8.000 kg (40.0%) | — |
| Pork fat trimmings | — | 8.000 kg (40.0%) |
| Ice water | 5.382 kg (26.9%) | 5.832 kg (26.9%) |
| Dried skimmed milk | 0.672 kg (3.4%) | 0.672 kg (3.4%) |
| Curing salt | 0.200 kg (1.0%) | 0.200 kg (1.0%) |
| Common salt | 0.150 kg (0.8%) | 0.240 kg (1.2%) |
| Phosphate | 0.094 kg (0.5%) | 0.094 kg (0.5%) |
| White pepper | 0.026 kg (0.1%) | 0.040 kg (0.2%) |
| Mace | 0.006 kg (0.03%) | 0.010 kg (0.05%) |
| Ginger | 0.006 kg (0.03%) | 0.010 kg (0.05%) |
| Coriander seed | 0.006 kg (0.03%) | 0.010 kg (0.05%) |

The amounts of curing salt were equal in the two batches, whereas the amounts of common salt and of the spice ingredients were reduced in the batch of low calorie sausages relative to the corresponding conventional reference batch. In the above formulation for the test batch the omitted weight of the above ingredients having been reduced was replaced by a corresponding additional weight of shank meat (0.580 kg). In the remaining formulations of this Example all ingredients apart from the shank meat, the cooked potatoes and the fat trimmings were as shown in the above formulations.

All batches were prepared in substantially the same manner: As an initial step the shank meat and the cooked, peeled potatoes were preground through a plate having 5 mm openings. Half of the meat was transferred to a high-speed grinder together with the phosphate and half of the salt. The grinder was then operated at 2800 rpm for 60 seconds during which half of the ice water was added. The grinder was stopped and subsequently operated at 1400 rpm for 30 seconds during which dried skimmed milk powder and the remaining ice water were added and the grinder operated for a further 30 seconds at 2800 rpm and stopped. The remaining half of the meat and of the salt were added followed by operating the grinder for 30 seconds at 2800 rpm.

After stopping of the grinder the ground cooked potatoes (test batches) or the pork fat trimmings (reference batches) were added to the mixture together with the spicing ingredients and the grinder operated for 60 seconds at 2800 rpm to obtain the final sausage mixtures. When added the meat, cooked potatoes and the fat trimmings had a temperature of about 5° C., and the temperature of the final sausage mixtures had a temperature of 12°–14° C.

The sausage mixtures were transferred to a sausage filler and stuffed into 22 mm collagen casings. The thus obtained stuffed sausages were subsequently subjected to a smoking and cooking treatment including the following steps:

| Maturation | 15 minutes/50° C./75% RH |
|---|---|
| Drying | 15 minutes/60° C./65% RH |
| Smoking | 25 minutes/75° C./65% RH |
| Cooking | 20 minutes/85° C. (water bath) |
| Cooling | 20 minutes/ 8° C. (water sprinkling) |

Finally, the sausages were dried and cooled further in a cold room and vacuum-packaged in plast foil.

The described test batches and reference batches were tested for their emulsion stability according to two different procedures which are generally used in the art:

(1) Determination of weight loss during cooking

The sausages were weighed immediately prior to cooking (initial weight). Cooking was done in a conventional household manner by frying on a saucepan using a moderate amount of melted and heated margarine. When the sausages were cooked their weight was determined again (cooked weight). The reduction in weight (initial weight-cooked weight) was calculated as percentage relative to the initial weight.

The results are shown in Table 9 below.

(2) Determination of release of meat jelly and far during autoclaving

Before stuffing the freshly prepared sausage mixture into casings an amount hereof was filled into cans holding 450 g and subsequently autoclaved essentially as described in Example 4. The amounts of meat jelly and fat which had collected at the top were measured as described in Example 3. The results expressed as percentages of the initial weight of the sausage mixtures are summarized in table 9 below:

TABLE 9

Indications of emulsion stability as determined by cooking weight loss and release of meat jelly and fat during autoclaving

| Proportion of cooked potatoes/ fat trimmings (w/w %) | Cooking weight loss, w/w % | Release of fat, w/w % | Release of meat jelly, w/w % |
|---|---|---|---|
| 40, test batch | 6.5 | 0.0 | 4.5 |
| 40, reference batch | 6.1 | 9.8 | 21.1 |
| 30, test batch | 6.3 | 0.0 | 5.6 |
| 30, reference batch | 5.9 | 0.0 | 5.1 |
| 20, test batch | 7.0 | 0.0 | 4.3 |
| 20, reference batch | 6.2 | 0.0 | 4.5 |
| 10, test batch | 5.1 | 0.0 | 5.7 |
| 10, reference batch | ND | 0.0 | 5.7 |

It appears from these results that the stability of the sausage mixture emulsion in the reference batch comprising 40% by weight of fat trimmings was significantly impaired relative to the corresponding low calorie test batch and relative to all other batches tested. At proportions of 30% by weight or less of cooked potatoes and fat trimmings, respectively the emulsion stability appears to be essentially the same for test batches and reference batches at the same proportion level of cooked potatoes/fat trimmings and also at different levels hereof.

EXAMPLE 8

The effect of the proportions of salt, phosphate, skimmed milk powder and wheat flour on the emulsion stability of low calorie sausage mixtures Three different test batches of low calorie sausages comprising varying proportions of the water binding ingredients salt, phosphate, skimmed milk powder and wheat flour and varying proportions of spices and flavouring ingredients were prepared substantially according to the procedure described in Example 7. Concomitantly, three reference sausage batches were prepared which had the same ingredient formulations as the test batches with the exception that peeled cooked potatoes were replaced proportionately by pork fat trimmings and the amounts of spices and flavouring ingredients were about 3 times higher.

The three test batches had the following ingredient formulations:

|  | w/w % of ingredient in: | | |
| --- | --- | --- | --- |
|  | Batch 1 | Batch 2 | Batch 3 |
| Lean pork shank meat | 29.8 | 29.9 | 29.9 |
| Ice water | 30.0 | 30.0 | 30.0 |
| Cooked peeled potatoes | 30.0 | 35.0 | 39.0 |
| Pork fat trimmings | 0.0 | 0.0 | 0.0 |
| Curing salt | 2.0 | 1.0 | 1.0 |
| Phosphate | 0.5 | 0.25 | 0.0 |
| Dried skimmed milk | 4.0 | 2.0 | 0.0 |
| Wheat flour | 3.5 | 1.75 | 0.0 |
| Spices/flavorings*) | 0.2 | 0.1 | 0.05 |

*)White pepper, mace, ginger, coriander seed

The corresponding reference batches had the following ingredient formulations:

|  | w/w % of ingredient in: | | |
| --- | --- | --- | --- |
|  | Batch 1 | Batch 2 | Batch 3 |
| Lean pork shank meat | 29.3 | 29.6 | 29.8 |
| Ice water | 30.0 | 30.0 | 30.0 |
| Cooked peeled potatoes | 0.0 | 0.0 | 0.0 |
| Pork fat trimmings | 30.0 | 35.0 | 39.0 |
| Curing salt | 2.0 | 1.0 | 1.0 |
| Phosphate | 0.5 | 0.25 | 0.0 |
| Dried skimmed milk | 4.0 | 2.0 | 0.0 |
| Wheat flour | 3.5 | 1.75 | 0.0 |
| Spices/flavorings*) | 0.7 | 0.35 | 0.02 |

*)White pepper, mace, ginger, coriander seed

The above test batches and reference batches were tested for their emulsion stability according to the procedure for the determination of release of meat jelly and fat as described in Example 7. The results of these measurements are summarized below:

TABLE 10

Indications of emulsion stability as determined by release of meat jelly and fat during autoclaving

| Tested batch of sausages | Release of fat, ww % | Release of meat jelly, w/w % | Total release, w/w % |
| --- | --- | --- | --- |
| Test batch 1 | 0.0 | 0.4 | 0.4 |
| Reference batch 1 | 0.0 | 1.4 | 1.4 |
| Test batch 2 | 0.0 | 9.1 | 9.1 |
| Reference batch 2 | 1.7 | 12.8 | 14.5 |
| Test batch 3 | 0.0 | 29.5 | 29.5 |
| Reference batch 3 | 8.7 | 32.2 | 40.9 |

It appears that a decrease of the amounts of water binding ingredients in test batches as well as in reference batches resulted in a decreasing emulsion stability of the sausage mixtures. However, the decrease of emulsion stability was constantly higher in the reference batches when compared to the stability of the corresponding test batches. It can therefore be concluded that the replacement of fat in low calorie sausages by an equal amount of peeled, cooked potatoes improves the stability of the emulsion even when water binding ingredients which are traditionally used in the art are omitted. These results clearly indicate that the vegetable fat replacement ingredient had a significant water binding capacity.

EXAMPLE 9

Preparation of low calorie sausages comprising different vegetable fat replacement ingredients and their emulsion stability characteristics Three batches of low calorie sausages were prepared in which the same proportion of three different vegetable fat replacement ingredients were added. Batch 1 comprised 39.0 w/w % cooked, peeled potatoes; batch 2 comprised 39.0 w/w % of potato pulp, i.e. the material left when substantially all starch has been washed out with water and the remaining material has been drained; batch 3 comprised 39.0 w/w % of an aqueous suspension comprising 2.6% by weight of potato fibers, 18.2% by weight of commercially available potato starch and 79.2% by weight of tap water. The general ingredient formulation (w/w %) was as shown below:

| Lean pork shank meat | 30.0 |
| --- | --- |
| Icewater | 30.0 |
| Vegetable fat replacement ingredient | 39.0 |
| Curing salt | 1.0 |
| Spices/flavourings*) | 0.05 |

*)White pepper, mace, ginger, coriander seed

The batches were prepared essentially as described in Example 8.

All three batches of sausage mixtures were tested for their emulsion stability characteristics by determining the release of meat jelly and fat after autoclaving as described hereinbefore. The results of these test are summarized in Table 11 below:

TABLE 11

Indications of emulsion stability of low calorie sausage mixtures with different potato-derived fat replacement ingredients as determined by release of meat jelly and fat during autoclaving

| Tested batch of sausages | Release of fat, ww % | Release of meat jelly, w/w % | Total release, w/w % |
| --- | --- | --- | --- |
| Test batch 1 comprising cooked peeled potatoes | 0.0 | 32.1 | 32.1 |
| Test batch 2 comprising potato pulp | 0.0 | 20.6 | 20.6 |
| Test batch 3 comprising potato fiber/potato starch | 0.0 | 25.3 | 25.3 |

The above results illustrate that potato pulp and aqueous suspensions of potato fiber and potato starch are suitable fat replacement ingredients in low calorie meat products, both ingredients essentially being on a par with cooked peeled potatoes as regards the emulsion stability characteristics.

EXAMPLE 10

Preparation of low calorie saveloy with boiled potatoes

The ingredient formulation was as follows:

| Lean pork without visible fat | 16.000 kg (40.0%) |
| --- | --- |
| Peeled boiled potatoes | 9.600 kg (24.0%) |
| Ice water | 10.400 kg (26.0%) |
| Curing salt | 0.400 kg (1.0%) |
| Common salt | 0.320 kg (0.8%) |

| | |
|---|---|
| Carrageenan | 0.360 kg (0.9%) |
| Colouring agent | 0.080 kg (0.2%) |
| Phosphate | 0.252 kg (0.6%) |
| Potato starch | 1.200 kg (3.0%) |
| Soy protein | 1.200 kg (3.0%) |
| Sodium ascorbate | 0.020 kg (0.1%) |
| Spices | 0.168 kg (0.4%) |

The lean meat and the boiled potatoes pre-cooled to about 5° C. were comminuted by grinding through a plate having 3 mm openings (step a). Half of the comminuted meat and 4 kg of the icewater were transferred to a high-speed mixer having 6 rotating knives, together with the curing salt, common salt, colouring agent and phosphate and these ingredients were further comminuted by operating the high-speed mixer during 30 turns of the bowel (step b). The mixer was stopped and the soy protein, the potato starch and the remaining ice water was added followed by operating the mixer during another 30 bowel turns (step c). As the last mixing step, the pre-comminuted boiled potatoes and the remaining half of the pre-comminuted lean meat was added to the resulting mixture and the mixer was operated during 20 bowel turns (step d) to obtain a coherent saveloy mixture which was stuffed in 52 mm casings and subsequently immersed in water having a temperature of about 80° C. for about 75 minutes.

As a reference product a batch of saveloy in which 24% of fat was added instead of boiled potatoes was prepared essentially according to the process described above.

The resulting batches of saveloy were subjected to chemical analyses by methods known per se and their total energy contents and the relative contributions thereto of carbohydrates, protein and fat were calculated on the basis of these analytical data:

TABLE 12

Composition of saveloy batches with 24% by weight of boiled potatoes (w/w %) and the energy contents thereof.

| | Test batch | | Reference batch | |
|---|---|---|---|---|
| | % | % of total energy | % | % of total energy |
| Carbohydrates | 8.0 | 31.4 | 3.5 | 5.9 |
| Protein | 10.5 | 43.7 | 11.0 | 19.7 |
| Fat | 2.8 | 24.9 | 19.4 | 74.4 |
| Total energy, kJ per 100 g | | 437 | | 1015 |

The total energy content of the low calorie saveloy was only about 43% of that of the reference product. In this latter meat product the high fat content contributed with 74.4% of the total energy content, whereas in the test product the fat content only contributed 24.9%.

EXAMPLE 11

Preparation of low calorie saveloy comprising potato fiber and potato search as a fag replacement ingredient In the ingredient formulation of this product the boiled potatoes as included in the formulation of example 10 was replaced by 5.77% by weight of a potato starch product containing about 82% starch, 0.8%. by weight of a potato fiber product containing about 75% dietary fiber and 17.43% by weight of water. Consequently, this fat replacement ingredient contained 9.1% by weight of dietary fiber and 70.0% by weight of starch in the dry matter hereof. These proportions were selected on the basis that they corresponds to the average values found in potatoes.

The process of preparation comprised a step a and a step b as defined in example 10. In step c of the present process, the soy protein, the potato starch, the potato starch product and the potato fiber product were added to the mixture together with 13.372 kg of icewater. Step d and the subsequent stuffing and cooking steps were as defined in example 10.

The resulting batch of saveloy was subjected to chemical analyses by methods known per se and the total energy content and the relative contributions thereto of carbohydrates, protein and fat were calculated on the basis of these analytical data. The data were compared with the corresponding data for the reference product of example 11:

TABLE 13

Composition of a saveloy batch with 24% by weight of a fat replacement ingredient comprising a proportion of potato dietary fiber of 9.1% and a proportion of 70.0% potato starch in dry matter and the energy contents thereof.

| | Test batch | | Reference batch | |
|---|---|---|---|---|
| | % | % of total energy | % | % of total energy |
| Carbohydrates | 9.6 | 37.3 | 3.5 | 5.9 |
| Protein | 9.6 | 39.9 | 11.0 | 19.7 |
| Fat | 2.6 | 22.9 | 19.4 | 74.4 |
| Total energy, kJ per 100 g | | 442 | | 1015 |

The total energy content of the low calorie saveloy was only about 44% of that of the reference product. In this latter meat product the high fat content contributed with 74.4% of the total energy content, whereas in the test product the fat content only contributed 22.9%.

EXAMPLE 12

Preparation of low calorie saveloy comprising potato fiber and corn starch as a far replacement ingredient In the ingredient formulation of this product the boiled potatoes as included in the formulation of example 10 was replaced by 5.77% by weight of a corn starch product containing about 82% starch, 0.8% by weight of a potato fiber product containing about 75% dietary fiber and 17.43% by weight of water. Consequently, this fat replacement ingredient like that of example 12 contained 9.1% by weight of dietary fiber and 70.0% by weight of starch in the dry matter hereof. The process of preparation comprised a step a and a step b as defined in example 10. In step c of the present process, the soy protein, the potato starch, the corn starch product and the potato fiber product were added to the mixture together with 13.372 kg of icewater. Step d and the subsequent stuffing and cooking steps were as defined in example 10.

The resulting batch of saveloy was subjected to chemical analyses by methods known per se and the total energy content and the relative contributions thereto of carbohydrates, protein and fat were calculated on the basis of these analytical data. The data were compared with the corresponding data for the reference product of example 10:

TABLE 14

Composition of a saveloy batch with 24% by weight of a fat replacement ingredient comprising a proportion of potato dietary fiber of 9.1% and a proportion of 70.0% corn starch in dry matter and the energy contents thereof.

|  | Test batch | | Reference batch | |
| --- | --- | --- | --- | --- |
|  | % | % of total energy | % | % of total energy |
| Carbohydrates | 9.7 | 37.2 | 3.5 | 5.9 |
| Protein | 9.7 | 39.4 | 11.0 | 19.7 |
| Fat | 2.7 | 23.5 | 19.4 | 74.4 |
| Total energy, kJ per 100 g | | 448 | | 1015 |

The total energy content of the low calorie saveloy was only about 44% of that of the reference product. In this latter meat product the high fat content contributed with 74.4% of the total energy content, whereas in the test product the fat content only contributed 23.5%.

EXAMPLE 13

Preparation of low calorie saveloy comprising pea fiber and potato search as a fag replacement ingredient In the ingredient formulation of this product the boiled potatoes as included in the formulation of example 10 was replaced by 5.77% by weight of a potato starch product containing about 82% starch, 0.8% by weight of a pea fiber product containing about 75% dietary fiber and 17.43% by weight of water. Consequently, this fat replacement ingredient like that of example 12 contained 9.1% by weight of dietary fiber and 70.0% by weight of starch in the dry matter hereof. The process of preparation comprised a step a and a step b as defined in example 10. In step c of the present process, the soy protein, the potato starch, the potato starch product and the pea fiber product were added to the mixture together with 13.372 kg of icewater. Step d and the subsequent stuffing and cooking steps were as defined in example 10.

The resulting batch of saveloy was subjected to chemical analyses by methods known per se and the total energy content and the relative contributions thereto of carbohydrates, protein and fat were calculated on the basis of these analytical data. The data were compared with the corresponding data for the reference product of example 10:

TABLE 15

Composition of a saveloy batch with 24% by weight of a fat replacement ingredient comprising a proportion of pea dietary fiber of 9.1% and a proportion of 70.0% potato starch in dry matter and the energy contents thereof.

|  | Test batch | | Reference batch | |
| --- | --- | --- | --- | --- |
|  | % | % of total energy | % | % of total energy |
| Carbohydrates | 9.7 | 37.5 | 3.5 | 5.9 |
| Protein | 9.7 | 39.7 | 11.0 | 19.7 |
| Fat | 2.6 | 22.8 | 19.4 | 74.4 |
| Total energy, kJ per 100 g | | 444 | | 1015 |

The total energy content of the low calorie saveloy was only about 44% of that of the reference product. In this latter meat product the high fat content contributed with 74.4% of the total energy content, whereas in the test product the fat content only contributed 22.8%.

EXAMPLE 14

Preparation of low calorie saveloy comprising pea fiber and corn starch as a far replacement ingredient In the ingredient formulation of this product the boiled potatoes as included in the formulation of example 10 was replaced by 5.77% by weight of a corn starch product containing about 82% starch, 0.8% by weight of a pea fiber product containing about 75% dietary fiber and 17.43% by weight of water. Consequently, this fat replacement ingredient like that of example 11 contained 9.1% by weight of dietary fiber and 70.0% by weight of starch in the dry matter hereof. The process of preparation comprised a step a and a step b as defined in example 10. In step c of the present process, the soy protein, the potato starch, the corn starch product and the pea fiber product were added to the mixture together with 13.372 kg of icewater. Step d and the subsequent stuffing and cooking steps were as defined in example 10.

The resulting batch of saveloy was subjected to chemical analyses by methods known per se and the total energy content and the relative contributions thereto of carbohydrates, protein and fat were calculated on the basis of these analytical data. The data were compared with the corresponding data for the reference product of example 10:

TABLE 16

Composition of a saveloy batch with 24% by weight of a fat replacement ingredient comprising a proportion of pea dietary fiber of 9.1% and a proportion of 70.0% corn starch in dry matter and the energy contents thereof.

TABLE 16

Composition of a saveloy batch with 24% by weight of a fat replacement ingredient comprising a proportion of pea dietary fiber of 9.1% and a proportion of 70.0% corn starch in dry matter and the energy contents thereof.

|  | Test batch | | Reference batch | |
| --- | --- | --- | --- | --- |
|  | % | % of total energy | % | % of total energy |
| Carbohydrates | 9.7 | 37.4 | 3.5 | 5.9 |
| Protein | 9.8 | 40.0 | 11.0 | 19.7 |
| Fat | 2.6 | 22.7 | 19.4 | 74.4 |
| Total energy, kJ per 100 g | | 446 | | 1015 |

The total energy content of the low calorie saveloy was only about 44% of that of the reference product. In this latter meat product the high fat content contributed with 74.4% of the total energy content, whereas in the test product the fat content only contributed 22.7%.

EXAMPLE 15

Preparation of low calorie saveloy comprising beer fiber and tapioca search as a fat replacement ingredient In the ingredient formulation of this product the boiled potatoes as included in the formulation of example 10 was replaced by 5.77% by weight of a tapioca starch product containing about 82% starch, 0.8% by weight of a beet fiber product containing about 75% dietary fiber and 17.43% by weight of water. Consequently, this fat replacement ingredient like that of example 10 contained 9.1% by weight of dietary fiber and 70.0% by weight of starch in the dry matter hereof. The process of preparation comprised a step a and a step b as defined in example 11. In step c of the present process, the soy protein, the potato starch, the tapioca starch product and the beet fiber product were added to the mixture together with 13.372 kg of icewater. Step d and the subsequent stuffing and cooking steps were as defined in example 10.

The resulting batch of saveloy was subjected to chemical analyses by methods known per se and the total energy content and the relative contributions thereto of carbohydrates, protein and fat were calculated on the basis of these analytical data. The data were compared with the corresponding data for the reference product of example 10:

TABLE 17

Composition of a saveloy batch with 24% by weight of a fat replacement ingredient comprising a proportion of beet dietary fiber of 9.1% and a proportion of 70.0% tapioca starch in dry matter and the energy contents thereof.

|  | Test batch | | Reference batch | |
|---|---|---|---|---|
|  | % | % of total energy | % | % of total energy |
| Carbohydrates | 9.3 | 35.6 | 3.5 | 5.9 |
| Protein | 9.9 | 40.1 | 11.0 | 19.7 |
| Fat | 2.8 | 24.3 | 19.4 | 74.4 |
| Total energy, kJ per 100 g | | 448 | | 1015 |

The total energy content of the low calorie saveloy was only about 44% of that of the reference product. In this latter meat product the high fat content contributed with 74.4% of the total energy content, whereas in the test product the fat content only contributed 24.3%.

EXAMPLE 16

Preparation of a low calorie liver paste comprising boiled potatoes as the vegetable fat replacement ingredient The liver paste ingredient formulation was as follows:

| Pork liver | 27.75% |
|---|---|
| Boiled peeled potatoes | 27.75% |
| Potato pot liquor | 32.65% |
| Common salt | 0.80% |
| Lactose | 0.78% |
| Sorbic acid | 0.08% |
| Wheat starch | 3.59% |
| Potato starch | 0.98% |
| Skim milk powder | 3.27% |
| Caseinate (98.2% protein) | 0.48% |
| Sunflower oil | 1.21% |
| Spices | 0.66% |

The potatoes were provided in the form of pre-boiled whole peeled potatoes packaged in plastic bags with the water which they had been boiled by immersing the bags into boiling water for 20 minutes. Prior to use the bags were opened and the potatoes transferred to a vessel containing boiling water and kept here for about 5 minutes to obtain a temperature of about 90° C.

1.6% of the boiling potato pot liquor, calculated on the final product and the caseinate was transferred to a KS (Karl Schnell) milling equipment comprising a cylindrical vessel having a conically shaped bottom part provided with a rotating two-bladed propeller having blunt edges. After milling for 20 seconds the sunflower oil was added and the milling continued for another 40 seconds to obtain a stable smooth emulsion (step i). The whole liver, the hot whole potatoes and the remaining ingredients including the rest of the boiling potato pot liquor was added (step ii) followed by mixing for 2 minutes during which mixture the liver and the potatoes were disintregated by the rotating propeller into coarse particles having an average largest diameter of at least 5 mm which due to the rotation of the propeller were distributed evenly in the emulsion. Finally, this second mixture was passed from the mixing vessel through a high speed grinder having a plate with 3 mm openings which plate was attached to the conical bottom part of the mixing vessel which passage resulted in the formation if a coherent mixture as defined hereinbefore containing additional ingredients (step iv). The passage of the above mixture through the grinder was effected by applying vacuum to the vessel. After passage through the high-speed grinder the coherent mixture containing additional ingredients was transferred to a filling machine and distributed into 500 ml aluminium foil containers and subsequently baked in a pre-warmed oven at 190° C. for about 1 hour.

EXAMPLE 17

Influence on meat product consistency of the amount of vegetable fat replacement ingredient and of the dietary fiber/starch weight ratio Five series each consisting of six low calorie sliceable sausage products were prepared essentially as defined in Example 10. The series comprised products which contained the following proportions of a vegetable fat replacement ingredient comprising the total amount of carrageenan and potato starch as dry powder: 2.5, 5.0, 7.5, 10.0 and 12.5 weight percent, calculated on the products. In each of these series, the dietary fiber/starch weight ratio were varied to obtain the following ratios: 1:1, 1:2, 1:4, 1:8, 1:16 and 1:32. A reference product having the following composition was also prepared:

| lean pork (8% fat) | 50% |
|---|---|
| lard | 25% |
| water | 21.7% |
| salt | 1% |
| curing salt | 1% |
| seasoning ingredients | 0.6% |

In the test product, lard was replaced by the above amounts of dry fat replacement ingredients and additional water up to 25%.

The consistency of the low calorie products was assessed by a test panel of 7 persons having extensive experience in rating the sensory quality of meat products. The consistency of the products was rated according to a hedonic rating scale. Each category has an assigned numerical value ranging from −5 to +5 where i.a. 0 indicates good quality, −1 insignificant defects and −2 slight defects.

The results are summarized in Table 18 below:

TABLE 18

Mean Ratings for Consistency of Test Products

| Dietary fiber/ starch ratio | Amount of dietary fiber/starch, % weight | | | | | −x |
|---|---|---|---|---|---|---|
|  | 2.5 | 5.0 | 7.5 | 10.0 | 12.5 |  |
| 1:1 | −0.1 | −0.7 | −1.1 | −1.1 | −1.9 | −0.98 |
| 1:2 | −0.6 | −0.3 | −0.3 | −1.3[d)] | −2.3[d)] | −0.96 |

TABLE 18-continued

Mean Ratings for Consistency of Test Products

| Dietary fiber/ starch ratio | Amount of dietary fiber/starch, % weight | | | | | −x |
|---|---|---|---|---|---|---|
| | 2.5 | 5.0 | 7.5 | 10.0 | 12.5 | |
| 1:4 | −1.4[s] | −0.1 | −0.9 | −0.4 | −2.6 | −1.08 |
| 1:8 | −1.6[s] | −1.4[s] | −1.1 | −1.9 | −2.6[d] | −1.72 |
| 1:16 | −2.0[s] | −1.9[s] | −1.6[d] | −2.4[d] | −3.4[d] | −2.26 |
| 1:32 | −1.6[s] | −1.4[s] | −0.9 | −1.0 | −3.1[d] | −1.60 |
| −x | −1.22 | −0.97 | −0.98 | −1.35 | −2.65 | −1.43 |

[s] spongy consistency
[d] dry consistency

It appears that with a dry fat replacement ingredient comprising a combination of carrageenan and potato starch, the best results were obtained when the ingredient was added in amounts ranging from 2.5 to 7.5% and when the dietary fiber/starch ratio was within the range of 1:1 to 1:4.

However, acceptable products were also obtained in some instances outside these ranges. It was clearly demonstrated that a certain proportion of dietary fiber relative to the starch component is required to avoid the occurrence of a spongy consistency of the low calorie meat products and furthermore that a dry consistency occurs at the higher amounts of dry fat replacement ingredient.

In this experiment, the consistency quality of the test products was rated slightly lower than that of the reference product, the mean rating of which was 0.4±1.1 (s.d.).

EXAMPLE 18

Preparation of low calorie saveloy produces comprising various vegetable far replacement ingredients and sensory resting of the products A series comprising five low calorie test products and a reference product containing 25% fat were prepared essentially according to the method defined in Example 10. All products comprised a total of 6.1% by weight of the following dry ingredients: curing salt, common salt, phosphates, colour, soy protein, sodium ascorbate and spices. The products comprised the following major ingredients:

| Ingredient | Ref. | % Test product No. | | | | |
|---|---|---|---|---|---|---|
| | | 1 | 2 | 3 | 4 | 5 |
| Pork, 7–9% fat | 40.1 | 40.1 | 40.1 | 40.1 | 40.1 | 40.1 |
| Water | 24.9 | 32.4 | 31.9 | 26.7 | 21.8 | 43.5 |
| Lard | 24.9 | — | — | — | — | — |
| Boiled white rice | — | 17.5 | 17.5 | — | — | — |
| Potato fiber | — | — | 0.55 | 0.13 | — | 0.26 |
| Boiled brown rice | — | — | — | 21.1 | — | — |
| Carrots, boiled | — | — | — | — | 23.3 | — |
| Corn starch | — | — | — | — | 4.7 | — |
| Dried potato flakes | — | — | — | — | — | 6.1 |
| Potato starch | 3.0 | 3.0 | 3.0 | 3.0 | 3.0 | 3.0 |
| Carrageenan | 0.9 | 0.9 | 0.9 | 0.9 | 0.9 | 0.9 |
| Calculated starch | 2.40 | 6.54 | 6.54 | 6.54 | 6.16 | 6.24 |
| Calculated dietary fiber | 0.90 | 0.94 | 1.31 | 1.04 | 1.60 | 1.52 |
| Dietary fiber/starch | 1:2.7 | 1:7.0 | 1:5.0 | 1:6.3 | 1:3.9 | 1:4.1 |

The test products and the reference product were subjected to a sensory testing using a panel of 26 consumers. In each separate testing, half of the panelists rated 2 identical test product samples and 1 reference product sample, and the other half rated 2 identical reference samples and 1 test product sample. The samples were rated for (1) overall impression, (2) consistency, (3) taste, and (4) appearance, according to a hedonic scale indicating whether the products were: very poor (1), poor (2), neither poor nor good (3), good (4) and very good (5). The bracketed figures indicate numerical transformation values which were used for calculations of mean ratings and differences of mean ratings.

The results of the sensory testing are shown below as differences between mean ratings of each test product and the reference product.

TABLE 19

Sensory Ratings of Low Calorie Saveloy Products and a Reference Product containing 25% fat

| Parameter | Test Sample No. | | | | |
|---|---|---|---|---|---|
| | 1 | 2 | 3 | 4 | 5 |
| Overall | −0.42 | −0.09 | −0.14 | −0.39 | 0.09 |
| Appearance | 0.07 | −0.06 | 0.21 | −0.94 | 0.14 |
| Consistency | −0.06 | −0.03 | −0.51 | −0.09 | −0.07 |
| Taste | −0.46 | 0.03 | −0.02 | −0.15 | −0.27 |
| −x | −0.22 | −0.04 | −0.12 | −0.40 | −0.03 |

In conclusion, the test product were rated slightly lower than the reference product. However, the differences were not statistically significant except for sample No. 4. This product comprising cooked carrots was clearly rated as being less acceptable due to a poorer appearance. This was most likely due to the strong colour deriving from the carrots. This problem may be solved by adjusting the amount and type of food grade colouring agents. It was interestingly found that the ratings of sample No. 4 concerning taste and consistency were practically at the same level as the reference product. Furthermore, it was surprisingly found that the incorporation of additional dietary fiber in sample No. 2 relative to sample 1 improved the taste and the overall ratings significantly.

EXAMPLE 19

Preparation of low calorie hamburgers and measurements of cooking process weight losses Two series (A and B) of hamburgers were prepared according to recipes as defined below. Series A comprised a reference product and four test products. Series B comprised a reference product and three test products.

| | Series A Weight % of ingredient in sample | | | | |
|---|---|---|---|---|---|
| | Ref. | A1 | A2 | A3 | A4 |
| Beef, 23% fat | 100.0 | — | — | — | — |
| Beef, 11% fat | — | 87.0 | — | — | — |
| Beef, 4% fat | — | — | 80.0 | 80.0 | 80.0 |
| Beef, 30% fat | — | — | — | — | — |
| Beef, 10% fat | — | — | — | — | — |
| Boiled potatoes | 0.0 | 13.0 | 20.0 | — | — |
| Ice | — | — | — | 15.59 | 15.62 |
| Corn starch | — | — | — | 3.75 | — |
| Potato fiber | — | — | — | 0.66 | — |
| Pea starch | — | — | — | — | 2.95 |
| Pea fiber | — | — | — | — | 1.45 |
| Calculated fat % | 23.0 | 9.6 | 3.2 | 3.2 | 3.2 |

-continued

| | Series B Weight % of ingredient in sample | | | |
|---|---|---|---|---|
| | Ref. | B1 | B2 | B3 |
| Beef, 30% fat | 64.0 | — | — | — |
| Beef, 17% fat | — | 54.0 | — | — |
| Beef, 10% fat | 4.0 | 4.0 | 4.0 | 4.0 |
| Beef, 5.5% fat | — | — | 47.4 | 47.4 |
| Ice | 8.6 | 8.6 | 8.6 | 21.54 |
| Soy protein (58%) | 4.5 | 4.5 | 4.5 | 4.5 |
| Water | 15.0 | 15.0 | 15.0 | 15.0 |
| Soy protein (80%) | 3.1 | 3.1 | 3.1 | 3.1 |
| Common salt | 0.45 | 0.45 | 0.45 | 0.45 |
| Seasoning | 0.35 | 0.35 | 0.35 | 0.35 |
| Boiled potatoes | — | 10.0 | 16.6 | — |
| Corn starch | — | — | — | 3.11 |
| Potato fiber | — | — | — | 0.55 |
| Calculated fat % | 19.6 | 9.6 | 3.0 | 3.0 |

Hamburgers in Series A were prepared as follows:

The beef was ground together with ice through a plate having 3 mm openings and subsequently transferred to a Palmia blender. Dry ingredients or boiled potatoes were added, and the ingredients were blended 2 times for 2.5 minutes and at about 0° C. to obtain a coherent hamburger mixture which was transformed to a Formax patty former. After forming, the hamburger patties were transported on a conveyer through a freezer and finally packed in cartons for storage at −25° C.

The Series B hamburgers were prepared according to the following method:

The beef was ground together with the ice through a plate having 3 mm openings and the ground beef transported to a Palmia blender. Soy protein (80%), common salt and seasoning was added prior to blending for 2.5 minutes. Finally, soy protein (58%) presoaked in water was added followed by blending for another 2.5 minutes period to obtain a coherent hamburger mixture. The resultant mixture was formed and packed as described above.

Hamburgers of both series including the high-fat reference products were tested by a sensory panel essentially in the manner defined in Example 18. Prior to testing, the hamburger patties were cooked without use of any fat or oil in a Turbo fryer for 90 seconds. The cooked hamburgers were served to the panelists as burger meals comprising the cooked hamburger patties, buns, lettuce and a mild salad dressing. In connection with the testing, the weight loss of the hamburgers, resulting from the cooking process was recorded.

The sensory testing results are summarized in the below tables showing the differences between mean ratings of each test product and the reference product.

TABLE 20

Sensory Ratings of Low Calorie Hamburger Products and a Reference Hamburger containing 23% fat (Series A)

| | Test Sample No. | | | |
|---|---|---|---|---|
| Parameter | 1 | 2 | 3 | 4 |
| Overall | 0.34 | 0.55 | 0.39 | −0.20 |
| Appearance | −0.28 | 0.18 | 0.19 | −0.42 |
| Consistency | 0.36 | 0.88 | 0.32 | 0.06 |
| Taste | 0.46 | 0.37 | 0.27 | 0.02 |
| | 0.22 | 0.49 | 0.29 | −0.16 |

The mean ratings for the four low calorie test hamburger products were: 3.06, 3.30, 3.33 and 2.78%, respectively. In this series, ¾ of the low calorie test hamburgers were rated higher than the high-fat reference product. For all test samples, taste and consistency were rated higher than the reference.

As a results of the cooking process, the reference hamburger showed a weight loss of 28.5%. The corresponding figures for the test samples 1–4 were: 13.0, 7.8, 11.2 and 12.3%, respectively. These results clearly indicated that the cooking losses were significantly reduced in hamburgers in which the predominant part of the fat was replaced by a vegetable fat replacement ingredient.

TABLE 21

Sensory Ratings of Low Calorie Hamburger Products and a Reference Hamburger containing 23% fat (Series B)

| | Test Sample No. | | |
|---|---|---|---|
| Parameter | 1 | 2 | 3 |
| Overall | −0.10 | −0.08 | −0.37 |
| Appearance | 0.46 | −0.15 | 0.12 |
| Consistency | −0.22 | 0.01 | −0.09 |
| Taste | −0.22 | −0.38 | −0.49 |
| | −0.03 | −0.15 | −0.20 |

Overall, the differences of ratings were insignificant. The mean ratings for the three low calorie hamburger products were: 3.00, 2.70 and 3.09%, respectively.

Reference hamburger patties showed a cooking loss of 8.6% by weight, whereas the test samples 1–3 showed losses of 10.8, 4.6 and 5.3%, respectively.

We claim:

1. A low calorie meat product comprising:
   (a) a mixture comprising
      (1) comminuted lean meat that contains at least 1% fat and that is substantially free from visible fat, the proportion of which is in the range of 20–95% by weight, calculated on the mixture,
      (2) a vegetable fat replacement ingredient comprising dietary fiber and starch in a weight ratio which is in the range of 1:20 to 1:4, the proportion of the dietary fiber being at least 5% by weight of the fat replacement ingredient dry matter when determined as non-starch polysaccharides (NSP), and the proportion of the starch being at least 50% of the fat replacement ingredient dry matter, which fat replacement ingredient is capable of having or being brought into a homogeneous consistency essentially without sensory recognizable particles in the mixture, the proportion of said vegetable fat replacement ingredient being in the range of 5–80% by weight, calculated on the mixture,
   (b) optionally added salt, the proportion of which when added being in the range of 0.1–4% by weight, calculated on the mixture, and
   (c) optionally added water, the proportion of which when added is in the range of 5–50% by weight, calculated on the mixture, wherein the product has a fat content which is at the most 15% by weight when the product is a hamburger product and the content of fat being at the most 10% by weight when the product is not a hamburger product, with the provisos that (i) when the comminuted lean meat is fish meat, the fat does not comprise hardened fat and (ii) the dietary fiber is not konjak mannan, and wherein the contribution of fat in the low calorie meat product to the total energy content of the low calorie meat product is less than 50%.

2. A low calorie meat product according to claim 1 comprising at least 60% by weight of the native water content of the ingredients hereof.

3. A low calorie meat product according to claim 1 which is a product selected from the group consisting of a hamburger product, a sausage product, a sliceable meat product and a spreadable meat product.

4. A low calorie meat product according to claim 3 wherein the hamburger product in addition to the comminuted meat and the vegetable fat replacement ingredient comprises one or more ingredients selected from the group consisting of added salt and added water.

5. A low calorie hamburger product according to claim 4 wherein the total proportion of fat is less than 12% by weight.

6. A low calorie meat product according to claim 5 wherein the total proportion of fat is less than 10% by weight.

7. A low calorie meat product according to claim 5 wherein the total proportion of fat is less than 7% by weight.

8. A low calorie meat product according to claim 5 wherein the total proportion of fat is less than 5% by weight.

9. A low calorie meat product according to claim 5 wherein the total proportion of fat is less than 3% by weight.

10. A low calorie meat product according to claim 1 wherein the mixture is a coherent forcemeat mixture.

11. A low calorie meat product according to claim 1 wherein the total amount of dietary fiber and starch present in the vegetable fat replacement ingredient is at least 5% by weight, calculated on the product.

12. A low calorie meat product according to claim 1 wherein the proportion of dietary fiber in the fat replacement ingredient is at least 10% by weight.

13. A low calorie meat product according to claim 12 wherein the proportion of dietary fiber in the fat replacement ingredient is at least 15% by weight.

14. A low calorie meat product according to claim 1 wherein the dietary fiber and the starch are native non-modified dietary fiber and starch.

15. A low calorie meat product according to claim 1 wherein the vegetable fat replacement ingredient is a native non-fractionated plant material having a water content of at least 70%.

16. A low calorie meat product according to claim 15 wherein the proportion of the vegetable fat replacement ingredient in the mixture is within the range of 10–70% by weight.

17. A low calorie meat product according to claim 15 wherein the vegetable fat replacement ingredient is selected from plant tuber materials and plant root materials.

18. A low calorie meat product according to claim 17 wherein the plant tuber material is potatoes.

19. A low calorie meat product according to claim 17 wherein the plant root material is selected from the group consisting of tapioca roots, cassava roots and arrowroots.

20. A low calorie meat product according to claim 15 wherein the native plant material is pre-cooked.

21. A low calorie meat product according to claim 15 wherein the proportion of the vegetable fat replacement ingredient in the mixture is within the range of 15–60% by weight.

22. A low calorie meat product according to claim 15 wherein the proportion of the vegetable fat replacement ingredient in the mixture is within the range of 20–50% by weight.

23. A low calorie meat product according to claim 1 wherein the vegetable fat replacement ingredient has a water content of at the most 20% by weight.

24. A low calorie meat product according to claim 23 wherein the proportion of the vegetable fat replacement ingredient in the mixture is in the range of 5–15% by weight.

25. A low calorie meat product according to claim 23 wherein the fat replacement ingredient is a non-fractionated native plant material selected from cereal grains and dicotyledonous plant seeds.

26. A low calorie meat product according to claim 25 wherein the fat replacement ingredient is in the form of particles having a largest diameter of at the most 2 mm.

27. A low calorie meat product according to claim 23 wherein the fat replacement ingredient is a mixture of separated starch and separated dietary fiber.

28. A low calorie meat product according to claim 27 wherein the separated starch is selected from grain flour starch, potato starch and tapioca starch.

29. A low calorie meat product according to claim 27 wherein the separated dietary fiber is selected from potato dietary fiber, potato pulp, beet fiber, pea fiber, bean fiber and tapioca fiber.

30. A low calorie meat product according to claim 23 wherein the proportion of the vegetable fat replacement ingredient in the mixture is in the range of 5–10% by weight.

31. A low calorie meat product according to claim 1 wherein the fat replacement ingredient is obtained by supplementing a native non-fractionated plant material, of which the dry matter proportion of dietary fiber is less than 5% by weight or the dry matter proportion of starch is less than 50% by weight, with a sufficient amount of separated starch or separated dietary fiber to result in a vegetable fat replacement ingredient as defined in claim 1.

32. A low calorie meat product according to claim 1 wherein the proportion of added water in the mixture is within the range of 15–40% by weight.

33. A low calorie meat product according to claim 1 wherein the added water is water in which vegetables or meat have been cooked.

34. A low calorie meat product according to claim 1 wherein the proportion of added salt in the mixture is in the range of 0.5–3% by weight.

35. A low calorie meat product according to claim 34 wherein the added salt is selected from the group consisting of a food-grade composition essentially comprising sodium chloride, a food-grade composition comprising sodium chloride and additional salts, and a food-grade composition comprising one or more alkali metal or alkaline earth metal salts, said food-grade composition comprising other salts than sodium chloride having essentially the same salty taste as sodium chloride.

36. A low calorie meat product according to claim 1 wherein the meat is selected from muscular tissue and edible offal including liver, kidneys, spleens, brains, tongues, or sweetbreads.

37. A low calorie meat product according to claim 36 wherein the meat is a mixture of meat from two or more animal species.

38. A low calorie meat product according to claim 1 wherein the product comprises one or more further ingredients selected from the group consisting of cooked or uncooked vegetables having a sensory-recognizable particle size, water binding agents, structurizing agents, preservatives, flavoring agents, spices, flavor-enhancing agents, sweetening agents, coloring agents, vitamins, smoke, and curing agents.

39. A low calorie meat product according to claim 1 wherein the total energy content is less than 700 kJ/100 g.

40. A low calorie meat product according to claim 39 wherein the total energy content is less than 600 kJ/100 g.

41. A low calorie meat product according to claim 40 wherein the total energy content is less than 500 kJ/100 g.

42. A low calorie meat product according to claim 39 wherein the total energy content is less than 400 kJ/100 g.

43. A low calorie meat product according to claim 1 which has essentially the same taste, texture, and appearance as a conventionally prepared high-fat meat.

44. A low calorie meat product according to claim 1 wherein the total proportion of meat jelly and fat released from the product after autoclaving the product when filled into a can holding 450 g for 70 minutes at a pressure of 2.1 bars, is less than 6% by weight relative to the total amount of product filled into the can.

45. A low calorie meat product according to claim 1 wherein the meat product is packaged.

46. A low calorie meat product according to claim 1 which has been subjected to a preservation and/or cooking treatment.

47. A low calorie meat product according to claim 1 which constitutes a ready-to-cook or ready-to-eat consumer meal or forms part thereof.

48. A low calorie meat product according to claim 1 which is a pet animal food.

49. A low calorie meat product according to claim 48 wherein at least part of the meat is edible slaughter offal selected from the group consisting of blood, intestines, stomachs, genital organs and respiratory organs.

50. A low calorie meat product according to claim 1 wherein the proportion of comminuted lean meat substantially free from visible fat in the mixture is within the range of 30–50% by weight.

51. A low calorie meat product according to claim 1 wherein the dietary fiber/starch weight ratio in the vegetable fat replacement ingredient is in the range of 1:15 to 1:4.

52. A low calorie meat product according to claim 1 wherein the dietary fiber/starch weight ratio in the vegetable fat replacement ingredient is in the range of 1:10 to 1:4.

53. A low calorie meat product according to claim 1 wherein the proportion of added water in the mixture is within the range of 20–35% by weight.

54. A low calorie meat product according to claim 1 wherein the proportion of added salt in the mixture is in the range of 1–2% by weight.

55. A low calorie meat product according to claim 1 wherein the contribution of the fat content to the total energy content is less than 40%.

56. A low calorie meat product according to claim 1 wherein the contribution of the fat content to the total energy content is less than 30%.

57. A low calorie meat product according to claim 1 wherein the contribution of the fat content to the total energy content is less than 20%.

58. A low calorie meat product according to claim 1 wherein the total proportion of fat is less than 8% by weight.

59. A low calorie meat product according to claim 1 wherein the total proportion of fat is less than 3% by weight.

60. A low calorie meat product according to claim 1, wherein the meat is obtained from mammals and birds.

61. A low calorie meat product according to claim 1, wherein the meat is selected from the group consisting of liver, kidney, spleen, brain, tongue, and sweetbreads.

62. A low calorie meat product according to claim 1, wherein the meat is selected from the group consisting of beef, veal, pork and lamb.

63. A low calorie meat product according to claim 1, wherein the meat is selected from the group consisting of beef, pork and chicken.

64. A low calorie meat product according to claim 1, wherein the comminuted lean meat contains between 1 and 10% fat.

65. A low calorie meat product comprising:
   a coherent forcemeat mixture comprising
   (1) a comminuted lean meat substantially free from visible fat, the proportion of which is in the range of 20–90% by weight, calculated on the mixture,
   (2) a vegetable fat replacement ingredient comprising dietary fiber and starch in a weight ratio which is in the range of 1:20 to 1:4, the proportion of the dietary fiber being at least 5% by weight of the fat replacement ingredient dry matter when determined as non-starch polysaccharides (NSP), and the proportion of the starch being at least 50% of the fat replacement ingredient dry matter, which fat replacement ingredient is capable of having or being brought into a homogeneous consistency essentially without sensory recognizable particles in the coherent mixture, the proportion of said vegetable fat replacement ingredient being in the range of 5–80% by weight, calculated on the mixture,
   (3) optionally added salt, the proportion of which is in the range of 0.1–4% by weight, calculated on the mixture, and
   (4) optionally added water, the proportion of which is in the range of 10–50% by weight, calculated on the mixture, the product having a fat content which is at the most 10% by weight, and wherein the contribution of fat in the low calorie meat product to the total energy content of the low calorie meat product is less than 50%.

66. A low calorie meat product according to claim 65 which is a product selected from the group consisting of sausage products, sliceable meat products and spreadable meat products.

67. A low calorie meat product according to claim 66 which is a spreadable meat product comprising an edible oil.

68. A low calorie meat product according to claim 65 wherein the total proportion of fat is less than 7% by weight.

69. A low calorie meat product according to claim 68 wherein the total proportion of fat is less than 5% by weight.

70. A low calorie meat product according to claim 68 wherein the total proportion of fat is less than 3% by weight.

71. A low calorie meat product according to any of the preceding claims wherein the proportion of comminuted lean meat substantially free from visible fat in the mixture or the coherent forcemeat mixture is within the range of 25–70% by weight.

72. A low calorie meat product according to claim 65 wherein the total proportion of fat is less than 8% by weight.

73. A low calorie meat product according to claim 65, additionally comprising added salt and added water.

74. A low calorie meat product according to claim 65, wherein the contribution of the fat content of the low calorie meat product to the total energy content of the low calorie meat product is less than 40%.

75. A low calorie meat product according to claim 65, wherein the contribution of the fat content of the low calorie meat product to the total energy content of the low calorie meat product is less than 30%.

76. A low calorie meat product according to claim 65, wherein the contribution of the fat content of the low calorie meat product to the total energy content of the low calorie meat product is less than 20%.

\* \* \* \* \*